(12) United States Patent
Hand et al.

(10) Patent No.: US 11,817,901 B2
(45) Date of Patent: Nov. 14, 2023

(54) TRANSMITTING AND RECEIVING DATA USING A SATELLITE COMMUNICATIONS NETWORK

(71) Applicant: Infinera Corporation, Sunnyvale, CA (US)

(72) Inventors: Steven Joseph Hand, Los Gatos, CA (US); Tulasi Veguru, Sunnyvale, CA (US); Prasad Paranjape, Fremont, CA (US); Han Henry Sun, Ottawa (CA)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/134,063

(22) Filed: Dec. 24, 2020

(65) Prior Publication Data

US 2022/0014269 A1     Jan. 13, 2022

Related U.S. Application Data

(60) Provisional application No. 62/970,608, filed on Feb. 5, 2020.

(51) Int. Cl.
| | |
|---|---|
| *H04B 10/00* | (2013.01) |
| *H04B 10/118* | (2013.01) |
| *H04B 10/61* | (2013.01) |
| *H04B 10/50* | (2013.01) |
| *H04B 10/29* | (2013.01) |
| *H04B 10/40* | (2013.01) |
| *H04B 10/516* | (2013.01) |

(52) U.S. Cl.
CPC ........... *H04B 10/118* (2013.01); *H04B 10/29* (2013.01); *H04B 10/40* (2013.01); *H04B 10/50* (2013.01); *H04B 10/503* (2013.01); *H04B 10/516* (2013.01); *H04B 10/61* (2013.01)

(58) Field of Classification Search
CPC ..... H04B 14/08; H04B 10/118; H04J 14/0298
See application file for complete search history.

(56) References Cited

U.S. PATENT DOCUMENTS

| | | | |
|---|---|---|---|
| 6,545,787 B1 * | 4/2003 | Lenormand | H04B 7/18521 |
| | | | 398/121 |
| 2004/0258415 A1 * | 12/2004 | Boone | H04B 10/1125 |
| | | | 398/125 |
| 2010/0166430 A1 * | 7/2010 | Alten | H04B 10/1141 |
| | | | 398/135 |
| 2013/0202297 A1 * | 8/2013 | Martinelli | G02B 6/3512 |
| | | | 398/49 |

(Continued)

*Primary Examiner* — Pranesh K Barua
(74) *Attorney, Agent, or Firm* — David L. Soltz

(57) ABSTRACT

An example apparatus includes an optical transmitter, an optical splitter, lenses, and mirrors. The optical splitter has an input and several outputs. The input of the optical splitter is optically coupled to the transmitter, such that each of the outputs of the optical splitter is operable to supply a corresponding one of a plurality of modulated optical signals, each of which includes a plurality of optical subcarriers. Each of the lenses is optically coupled to a respective one of the outputs of the optical splitter. Each of the lenses is operable to receive a corresponding one of the modulated optical signals. Each of the mirrors is optically coupled to a corresponding one of the lenses, such that each of the mirrors is operable to direct a respective one of the modulated optical signals for transmission through free space.

9 Claims, 26 Drawing Sheets

(56) References Cited

U.S. PATENT DOCUMENTS

| | | | |
|---|---|---|---|
| 2014/0092924 A1* | 4/2014 | Krause | H04J 14/0298 |
| | | | 398/79 |
| 2014/0314416 A1* | 10/2014 | Vassilieva | H04B 10/506 |
| | | | 398/76 |
| 2016/0105244 A1* | 4/2016 | Akiyama | H04B 10/50572 |
| | | | 398/186 |
| 2017/0272173 A1* | 9/2017 | Ito | H04B 10/614 |

* cited by examiner

Asymmetric BW Allocation of 4 DSC to pair J & K

Symmetric BW Allocation of 4 DSC to pair J & K

TRANSMITTING AND RECEIVING DATA USING A SATELLITE COMMUNICATIONS NETWORK

TECHNICAL FIELD

This disclosure relates to transmitting and receiving data using a satellite communications network.

BACKGROUND

Computing devices can exchange information with one another using a satellite communications network. As an example, computing devices can be interconnected to via one or more satellites orbiting the earth. The satellites can receive data packet from one or more of the computing devices (e.g., via one or more intermediary network devices, such as routers, hubs, switches, terrestrial transceivers, etc.), and forward each of the data packets to its respective destination computing device (e.g., via one or more intermediary network devices). In some implementations, data packets can be relayed between multiple different satellites before being forwarded to its destination.

SUMMARY

In an aspect, an apparatus includes a first communications module including a first transceiver, where the first communications module is operable to: (i) transmit, using the first transceiver, a plurality of first groups of optical subcarriers to a plurality of second communications modules via free-space optical communication, where the first groups of optical subcarriers carry first data, and each of the first groups of optical subcarriers is associated, respectively, with a different one of the second communications modules, and (ii) receive, using the first transceiver, plurality of second groups of optical sub carriers from the second communications modules via free-space optical communication, where the second groups of optical subcarriers carry second data and each of the second groups of optical subcarriers is associated, respectively, with a different one of the second communications modules.

Implementations of this aspect can include one or more of the following features.

In some implementations, the first communications module can be installed in a first satellite.

In some implementations, the apparatus can further include the plurality of second communications modules. Each of the second communications modules can include a respective second transceiver. Each of the second communications modules can be installed in a respective second satellite.

In some implementations, each of the optical subcarriers in the first groups of optical subcarriers can be a respective Nyquist optical subcarrier.

In some implementations, each of the optical subcarriers in the second groups of optical subcarriers can be a respective Nyquist optical subcarrier.

In some implementations, at least one of the first groups of optical subcarriers can have a single respective optical subcarrier.

In some implementations, at least one of the first groups of optical subcarriers can include two or more respective optical subcarriers.

In some implementations, at least one of the second groups of optical subcarriers can have a single respective optical subcarrier.

In some implementations, at least one of the second groups of optical subcarriers can include two or more respective optical subcarriers.

In some implementations, the first communications module can be operable to: (i) receive, using the first transceiver, a third group of optical subcarriers from a third communications modules via free-space optical communication, where the third group of optical subcarriers carries third data, and (ii) transmit, using the first transceiver, at least a portion of the third data to at least some of the second communications modules.

In some implementations, the first communications module can be configured to: (i) receive, using the first transceiver, radio frequency (RF) signals carrying third data from a terrestrial communications module, and (ii) transmit, using the first transceiver, at least a portion of the third data to at least some of the second communications modules.

In some implementations, the first communications module can be configured to transmit the first data to each of the plurality of second communications modules according to a first bandwidth. The first communications module can be configured to receive the second data from each of the plurality of second communications modules according to a second bandwidth. The first bandwidth can be different from the second bandwidth.

In some implementations, the first communications module can be configured to selectively demodulate a subset of the second groups of optical subcarriers.

In another aspect, a terrestrial control system is operable to be communicatively coupled to a constellation of satellites. The terrestrial control station includes one or more transmitters, one or more processors, and one or more non-transitory computer readable media storing instructions that, when executed by the one or more processors, cause the one or more processors to perform operations. The operations include (i) transmitting, using the one or more transmitters, instructions to a first satellite of the constellation to transmit a plurality of first groups of optical subcarriers to a plurality of second satellites of the constellation via free-space optical communication, where the first groups of optical subcarriers carry first data and each of the first groups of optical subcarriers is associated, respectively, with a different communications module of the second satellites, and (ii) transmitting, using the one or more transmitters, instructions to the second satellites to transmit a plurality of second optical subcarriers to the first satellite via free-space optical communication, where the second groups of optical subcarriers carry second data and each of the second groups of optical subcarriers is associated, respectively, with a different communications module of the second satellites.

Implementations of this aspect can include one or more of the following features.

In some implementations, the one or more transmitters can include one or more RF transmitters.

In some implementations, the operations can further include (i) transmitting, using the one or more transmitters, instructions to the first satellite to orbit an astronomical body according to a first orbit, (ii) transmitting, using the one or more transmitters, instructions to at least some of the second satellites to orbit the astronomical body according to a second orbit different from the first orbit, and (iii) transmitting, using the one or more transmitters, instructions to at least some of the second satellites to orbit the astronomical body according to a third orbit different from the first orbit and the second orbit.

In some implementations, the operations can further include (i) selecting the second satellites from the constellation of satellites according to a selection pattern, and (ii) transmitting, using the one or more transmitters, an indication of the second satellites to the first satellite.

In some implementations, the terrestrial control system can be operable to select the second satellites from the constellation of satellites according to the selection pattern by: (i) identifying a sequence of the satellites of the constellation of satellites that are in a same orbit as the first satellite, and (ii) selecting, as the second satellites, the satellites in the constellation of satellites that that are within two positions of the first satellite in the sequence.

In some implementations, the terrestrial control system can be operable to select the second satellites from the constellation of satellites according to the selection pattern by (i) identifying a sequence of the satellites of the constellation of satellites that are in a second orbit adjacent to a first obit of the first satellite, (ii) identifying a reference satellite in the constellation of satellites that is nearest the first satellite in the sequence, and (iii) selecting, as the second satellites, the satellites in the constellation of satellites that that are one position from the reference satellite in the sequence.

In some implementations, the terrestrial control system can be operable to select the second satellites from the constellation of satellites according to the selection pattern by: (i) identifying a sequence of the satellites of the constellation of satellites that are in a second orbit adjacent to a first obit of the first satellite; (ii) identifying a reference satellite in the constellation of satellites that is nearest the first satellite in the sequence, and (iii) selecting, as the second satellites, the satellites in the constellation of satellites that that are two positions from the reference satellite in the sequence.

In some implementations, each of the optical subcarriers in the first groups of optical subcarriers can be a respective Nyquist optical subcarrier.

In some implementations, each of the optical subcarriers in the second groups of optical subcarriers can be a respective Nyquist optical subcarrier.

In some implementations, at least one of the first groups of optical subcarriers can have a single respective optical subcarrier.

In some implementations, at least one of the first groups of optical subcarriers can include two or more respective optical subcarriers.

In some implementations, at least one of the second groups of optical subcarriers can have a single respective optical subcarrier.

In some implementations, at least one of the second groups of optical subcarriers can include two or more respective optical subcarriers.

In some implementations, the operations can further include (i) transmitting, using the one or more transmitters, instructions to the first satellite to receive a third group of optical subcarriers from a third satellite via free-space optical communication, where the third group of optical subcarriers carries third data, and (ii) transmitting, using the one or more transmitters, instructions to the first satellite to transmit at least a portion of the third data to at least some of the second satellites.

In some implementations, the operations can further include: (i) transmitting, using the one or more transmitters, radio frequency (RF) signals carrying third data to the first satellite, and (ii) transmitting, using the one or more transmitters, instructions to the first satellite to transmit at least a portion of the third data to at least some of the second satellite communications modules.

In some implementations, the operations can further include: (i) transmitting, using the one or more transmitters, instructions to the first satellite to transmit the first data to each of the plurality of second satellites according to a first bandwidth, and (ii) transmitting, using the one or more transmitters, instructions to the each of the second satellites to transmit the second data to the first satellite according to a second bandwidth. The first bandwidth can be different from the second bandwidth.

In some implementations, the operations can further include transmitting, using the one or more transmitters, instructions to the first satellite to selectively demodulate a subset of the second groups of optical subcarriers.

In another aspect, a method is performed by a terrestrial control system communicatively coupled to a constellation of satellites. The method includes: (i) transmitting, using one or more transmitters of the terrestrial control system, instructions to a first satellite of the constellation to transmit a plurality of first groups of optical subcarriers to a plurality of second satellites of the constellation via free-space optical communication, where the first groups of optical subcarriers carry first data and each of the first groups of optical subcarriers is associated, respectively, with a different communications module of the second satellites; and (ii) transmitting, using the one or more transmitters, instructions to the second satellites to transmit a plurality of second optical subcarriers to the first satellite via free-space optical communication, where the second groups of optical subcarriers carry second data and each of the second groups of optical subcarriers is associated, respectively, with a different communications module of the second satellites.

Implementations of this aspect can include one or more of the following features.

In some implementations, the method can further include (i) transmitting, using the one or more transmitters, instructions to the first satellite to orbit an astronomical body according to a first orbit, (ii) transmitting, using the one or more transmitters, instructions to at least some of the second satellites to orbit the astronomical body according to a second orbit different from the first orbit, and (iii) transmitting, using the one or more transmitters, instructions to at least some of the second satellites to orbit the astronomical body according to a third orbit different from the first orbit and the second orbit.

In some implementations, the method can further include (i) selecting the second satellites from the constellation of satellites according to a selection pattern, and (ii) transmitting, using the one or more transmitters, an indication of the second satellites to the first satellite.

In some implementations, selecting the second satellites from the constellation of satellites according to the selection pattern can include (i) identifying a sequence of the satellites of the constellation of satellites that are in a same orbit as the first satellite, and (ii) selecting, as the second satellites, the satellites in the constellation of satellites that that are within two positions of the first satellite in the sequence.

In some implementations, selecting the second satellites from the constellation of satellites according to the selection pattern can include (i) identifying a sequence of the satellites of the constellation of satellites that are in a second orbit adjacent to a first obit of the first satellite; (ii) identifying a reference satellite in the constellation of satellites that is nearest the first satellite in the sequence, and (iii) selecting, as the second satellites, the satellites in the constellation of satellites that that are one position from the reference satellite in the sequence.

In some implementations, selecting the second satellites from the constellation of satellites according to the selection pattern can include (i) identifying a sequence of the satellites of the constellation of satellites that are in a second orbit adjacent to a first obit of the first satellite; (ii) identifying a reference satellite in the constellation of satellites that is nearest the first satellite in the sequence, and (iii) selecting, as the second satellites, the satellites in the constellation of satellites that that are two positions from the reference satellite in the sequence.

In some implementations, each of the optical subcarriers in the first groups of optical subcarriers can be a respective Nyquist optical subcarrier.

In some implementations, each of the optical subcarriers in the second groups of optical subcarriers can be a respective Nyquist optical subcarrier.

In some implementations, at least one of the first groups of optical subcarriers can have a single respective optical subcarrier.

In some implementations, at least one of the first groups of optical subcarriers can include two or more respective optical subcarriers.

In some implementations, at least one of the second groups of optical subcarriers can have a single respective optical subcarrier.

In some implementations, at least one of the second groups of optical subcarriers can include two or more respective optical subcarriers.

In some implementations, the method can further include (i) transmitting, using the one or more transmitters, instructions to the first satellite to receive a third group of optical subcarriers from a third satellite via free-space optical communication, where the third group of optical subcarriers carries third data, and (ii) transmitting, using the one or more transmitters, instructions to the first satellite to transmit at least a portion of the third data to at least some of the second satellites.

In some implementations, the method can further include (i) transmitting, using the one or more transmitters, radio frequency (RF) signals carrying third data to the first satellite, and (ii) transmitting, using the one or more transmitters, instructions to the first satellite to transmit at least a portion of the third data to at least some of the second satellite communications modules.

In some implementations, the method can further include (i) transmitting, using the one or more transmitters, instructions to the first satellite to transmit the first data to each of the plurality of second satellites according to a first bandwidth, and (ii) transmitting, using the one or more transmitters, instructions to the each of the second satellites to transmit the second data to the first satellite according to a second bandwidth. The first bandwidth can be different from the second bandwidth.

In some implementations, the method can further include transmitting, using the one or more transmitters, instructions to the first satellite to selectively demodulate a subset of the second groups of optical subcarriers.

In another aspect, an apparatus includes an optical transmitter; an optical splitter having an input and a plurality of outputs, the input of the optical splitter being optically coupled to the transmitter, such that each of the plurality of outputs of the optical splitter is operable to supply a corresponding one of a plurality of modulated optical signals, each of which includes a plurality of optical subcarriers; a plurality of lenses, each of the plurality of lenses being optically coupled to a respective one of the plurality of outputs of the optical splitter, each of the plurality of lenses being operable to receive a corresponding one of the plurality of modulated optical signals; and a plurality of mirrors, each of the plurality of mirrors being optically coupled to a corresponding one of the plurality of lenses, such that each of the plurality of mirrors is operable to direct a respective one of the plurality of modulated optical signals for transmission through free space.

Implementations of this aspect can include one or more of the following features.

In some implementations, each of the plurality of modulated optical signals can include the same plurality of optical subcarriers.

In some implementations, each of the plurality of optical subcarriers can be a Nyquist subcarrier.

In some implementations, the plurality of modulated optical signals can be a second plurality of modulated optical signals. Each of the plurality of modulated optical signals can be a power split portion of a first modulated optical. The transmitter can include a laser, and a modulator. The laser can be operable to supply an optical signal to the modulator. The modulator can be operable to supply the first modulated optical signal based on the optical signal and a plurality of drive signals.

In some implementations, the apparatus can further include a plurality of driver circuits operable to supply the plurality of drive signals.

In some implementations, the apparatus can further include digital-to-analog conversion circuitry operable to provide an analog signal to the driver circuits based on digital signals.

In some implementations, the apparatus can further include a digital signal processor operable to provide the digital signals to the digital-to-analog conversion circuitry. The digital signal processor can be operable to provide the digital signals based on data provided to the digital signal processor.

In another aspect, an apparatus includes an optical transmitter operable to supply a modulated optical signal including a first plurality of optical subcarriers; a plurality of steering mechanisms operable to direct, through free-space, a corresponding one of a plurality of optical beams to a corresponding one of a plurality of transceivers, each of the plurality of optical beams including a power split portion of the modulated optical signal; and a receiver operable to receive a second plurality of optical subcarriers from the plurality of transceivers.

Implementations of this aspect can include one or more of the following features.

In some implementations, each of the first plurality of optical subcarriers can be a Nyquist subcarrier.

In some implementations, each of the second plurality of optical subcarriers can be a Nyquist subcarrier.

In another aspect, an apparatus includes a first mirror and a first lens, the first mirror being operable to receive a first plurality of optical subcarriers and direct the plurality of optical subcarrier to the first lens; a second mirror and a second lens, the second mirror being operable to receive a second plurality of optical subcarriers and direct the plurality of optical subcarriers to a second lens; an optical combiner including a first input operable to receive the first plurality of optical subcarriers from the first lens, and a second input operable to receive the second plurality of optical subcarriers from the second lens, the optical combiner having an output that provides the first and second pluralities of optical subcarriers; and a receiver operable to receive the first and second pluralities of optical subcarriers and output data based on the first and second pluralities of optical subcarriers.

Implementations of this aspect can include one or more of the following features.

In some implementations, each of the first plurality of optical subcarriers can be a Nyquist subcarrier.

In some implementations, each of the second plurality of optical subcarriers can be a Nyquist subcarrier.

In some implementations, the receiver can include a laser operable to supply a local oscillator signal; and an optical hybrid circuit operable to receive the local oscillator signal and first and second polarization components of the each of the first plurality of optical subcarriers and each of the second plurality of optical subcarriers and supply a plurality of mixing products.

In some implementations, the apparatus can further include photodiode circuitry operable to receive the plurality of mixing products and output first electrical signals based on the plurality of mixing products.

In some implementations, the apparatus can further include transimpedance amplifier circuitry operable to provide second electrical signals based on the first electrical signals.

In some implementations, the apparatus can further include analog-to-digital conversion circuitry operable to provide digital signals based on the second electrical signals.

In some implementations, the apparatus can further include a digital signal processor operable to output data based on the digital signals.

In some implementations, the apparatus can further include a transmitter operable to provide a third plurality of optical subcarriers.

In some implementations, each of the third plurality of optical subcarriers can be a Nyquist subcarrier.

In some implementations, the plurality of optical subcarriers can be a first plurality of optical subcarriers. The apparatus can further include an optical receiver operable to receive a second plurality of optical subcarriers.

The details of one or more embodiments are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

In an example satellite communications network, a first satellite of the satellite communications network can transmit data to multiple second satellites of the satellite communications network concurrently, such that similar data is "multicast" or "shared cast" to multiple satellites at the same time. Upon receipt of the data, each of the second satellites can selectively retain one or more portions of the data (e.g., the portions of the data that are intended for the satellite) and discard one or more other portions of the data (e.g., the portions of the data that are intended for other satellites). In some implementations, data can be transmitted as one or more optical subcarriers.

Further, at least some of the second satellites can include components that have capabilities different from the capabilities of other components included in first satellite. For example, the bandwidth or the data capacity of at least some of the transceivers of a first satellite can be greater than that of each of several second satellites. Accordingly, the first satellite can transmit data to each of those secondary nodes satellites to a higher bit rate (e.g., using a higher capacity transceiver), and each of those second satellites can transmit data to the first satellite according to a lower bit rate (e.g., using a lower capacity transceiver). In this scenario, downstream data (e.g., from the first satellite to the second satellites) is transmitted according to a larger pooled or shared allocation of bandwidth, whereas upstream data (e.g., from each of the second satellites to the first satellite) is transmitted according to respective smaller dedicated allocations of bandwidth.

Example implementations of the aforementioned aspects are described in further detail herein.

Further, the implementations described herein can provide can provide one or more technical benefits in the context of computer and satellite networking. For example, in at least some implementations, this configuration enables traffic to be transmitted in certain directions according to a pooled allocation of bandwidth (e.g., an amount of bandwidth that is shared among multiple satellites of the satellite communications network) to alleviate congestion, while also enabling traffic to be transmitted in certain other directions according to smaller dedicated allocations of bandwidth. Further, in at least some implementations, this configuration enables a satellite communications network to be deployed and maintained in a more cost efficient manner (e.g., compared to using solely high capacity transceivers across the entirety of the satellite communications network).

Figure 1A:
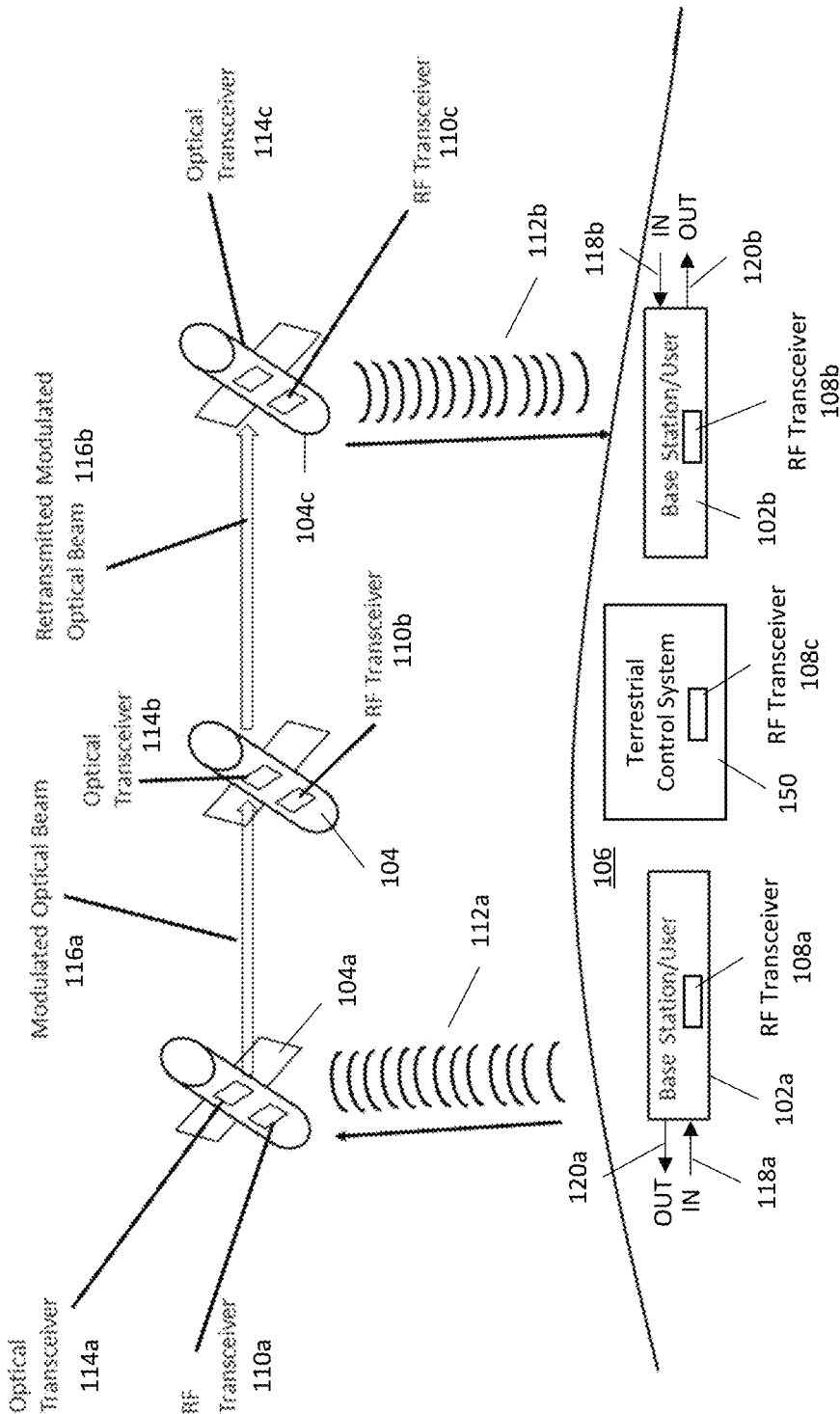
FIG. 1A is a diagram of an example satellite communications network.

An example satellite communications network 100 is shown in FIG. 1A. In this example, the satellite communications network 100 includes terrestrial nodes 102a and 102b (e.g., base stations and/or user devices), a constellation of satellites 104a-104c, and a terrestrial control system 150. The terrestrial nodes 102a and 102b and terrestrial control system 150 are positioned on an astronomical body 106, such as a planet (e.g., Earth) or a moon. Further, each of the satellites 104a-104c orbits around the astronomical body 106 (e.g., according to one or more orbits and/or orbital planes). In some implementations, at least some of the satellites 104a-104c can be in one or more low earth orbits (LEDs).

Figure 1B:
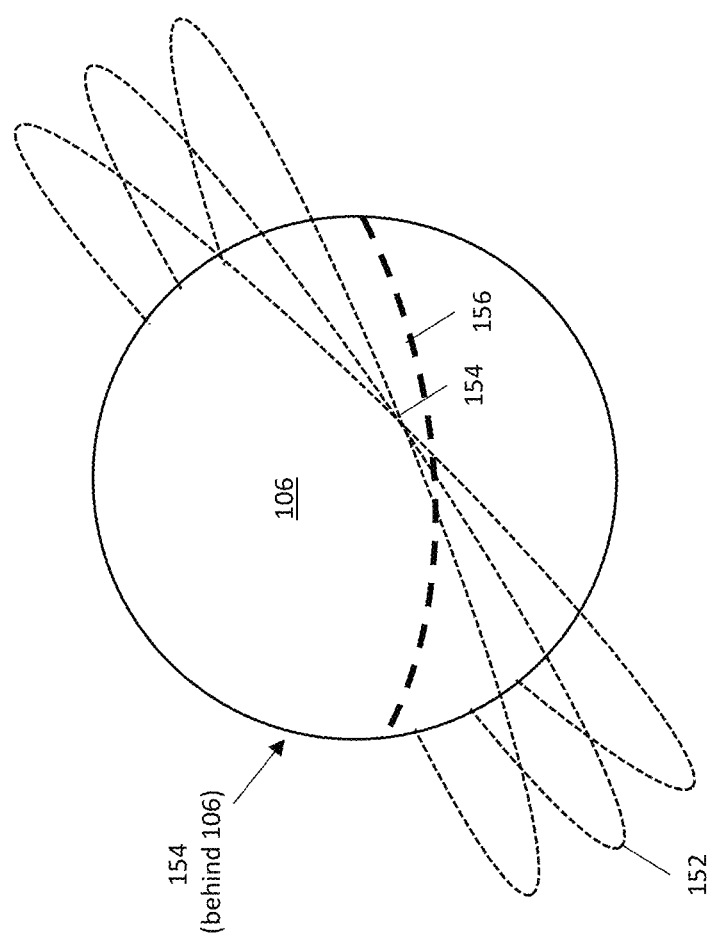
FIGS. 1B are 1C are diagrams of example orbits around an astronomical body.
Figure 1C:
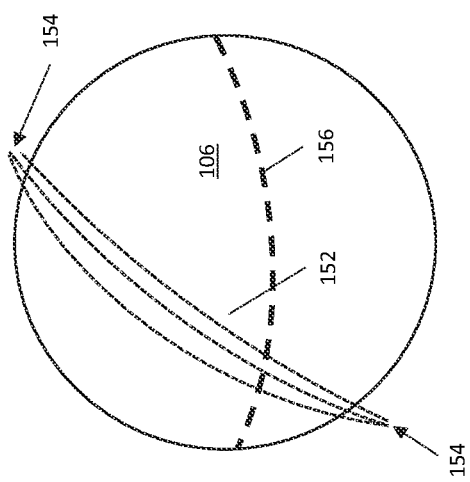

As an example, as shown in FIGS. 1B and 1C, at least some of the satellites 104a-104c can be in one or more orbits 152 around the astronomical body 106. Each of the orbits 152 can be a path (e.g., an elliptical or circular path) along an orbital plane. In some implementations, at least some of the orbits 152 and/or orbital planes can intersect one another. For example, each of the orbits 152 can have a different orbital inclination with respect to the astronomical body 106, and each of the orbits 152 can pass over two common points on opposing sides of the astronomical body. In the example shown in FIG. 1B, the orbits 152 are and/or orbital planes intersect at points 154 that are relatively closer to an equator 154 of the astronomical body 106, and have relatively longer radii of curvature (e.g., compared to those in the example shown in FIG. 1C). In some implementations, at least some of the orbits 152 can be low earth orbits (LEDs).

During an example operation of the satellite communication network 100, the terrestrial nodes 102a and 102b can exchange data to via the satellites 104a-104c. For example, the terrestrial node 102a can receive data (e.g., via an input 118a, such as one or more wired and/or wireless communications interfaces) from one or more other terrestrial nodes (e.g., other base stations or user devices), and transmit the data to a first satellite 104a. Upon receipt of the data, the first satellite 104a can relay at least a portion of the data to a second satellite 104b, which in turn can relay at least a portion of the data to a third satellite 104c. The third satellite 104c can transmit at least a portion of the data to the terrestrial node 102b. The terrestrial node 102b can output the data (e.g., via an output 120b, such as one or more wired and/or wireless communications interfaces) to one or more other terrestrial nodes (e.g., other base stations or user devices).

In the similar manner, the terrestrial node 102b can receive data (e.g., via an input 118b, such as one or more wired and/or wireless communications interfaces) from one or more other terrestrial nodes, and transmit the data to the third satellite 104c. Upon receipt of the data, the third satellite 104c can relay at least a portion of the data to the second satellite 104b, which in turn can relay at least a portion of the data to the first satellite 104a. The first satellite 104a can transmit at least a portion of the data to the terrestrial node 102a. The terrestrial node 102b can output the data (e.g., via an output 120a, such as one or more wired and/or wireless communications interfaces) to one or more other terrestrial nodes.

The terrestrial nodes 102a and 102b and the satellites 104a-104c can transmit the data according to different forms of communication.

For instance, the terrestrial nodes 102a and 102b can transmit data to and/or receive data from one of more of the satellites 104a-104c in the form of radio frequency (RF) transmissions. As an example, the terrestrial nodes 102a and 102b can include respective communications modules having RF transceivers 108a and 108b, respectively. Further, the satellites 104a-104c can include respective communications modules having RF transceivers 110a-110c, respectively. Each of the RF transceivers 108a and 108b can be configured to encode data in an RF signal and transmit the RF signal to one or more of the satellites 104a-104c. For example, the RF transceiver 108a can encode data in an RF signal 112a, and transmit the RF signal 112a from the terrestrial station 102a to the satellite 104a. Further, each of the RF transceivers 108a and 108b can be configured to receive an RF signal from one or more of the satellites 104a-104c, and decode the data that had been encoded therein. For example, the RF transceiver 108b can receive an RF signal 112b that is transmitted from the satellite 104c to the terrestrial node 102b, and decode the RF signal 112b to retrieve the data encoded therein.

Similarly, each of the RF transceivers 110a-110c can be configured to encode data in an RF signal and transmit the RF signal to one or more of the terrestrial nodes 102a and 102b. Further, each of the RF transceivers 110a-110c can be configured to receive an RF signal from one or more of the terrestrial nodes 102a and 102b and decode the data that had been encoded therein.

Further, the satellites 104a-104 can transmit data to and/or receive data from one another in the form of optical transmissions. As an example, the satellites 104a-104c can include respective communications modules having optical transceivers 114a-114c, respectively. Each of the optical transceivers optical transceivers 114a-114c can be configured to encode data in an optical signal (e.g., by modulating the optical signal according to one or more optical subcarriers, such as Nyquist optical subcarriers) and transmit the optical signal to one or more of the other satellites 104a-104c via free space optical communication. For example, the optical transceiver 110a can modulate an optical signal 116a (e.g., a carrier signal) according to one or more optical subcarriers, such that it carries information indicative of a particular portion of data, and transmit the optical signal 116a from the satellite 104a to the satellite 104b via free space optical communication. Further, the optical transceiver 114b can receive the optical signal 116a and demodulate the optical signal according to one or more optical subcarriers (e.g., the same optical subcarriers that were used to modulate the optical signal 114a) to retrieve the portion of data.

Similarly, the optical transceiver 110b can modulate an optical signal 116b (e.g., a carrier signal) according to one or more optical subcarriers, such that the optical signal carries information indicative of a particular portion of data, and transmit the optical signal 116b from the satellite 104b to the satellite 104c via free space optical communication. Further, the optical transceiver 114c can receive the optical signal 116b and demodulate the optical signal according to the one or more optical subcarriers (e.g., the same optical subcarriers that were used to modulate the optical signal 116b) to retrieve the portion of data.

In some implementations, a satellite 104a-104 can receive an optical signal and retransmit at least a portion of the optical signal to one or more other satellites 104a-104c without first demodulating the optical signal. For example, the satellite 104b can receive an optical signal from the satellite 104a, and retransmit some or all of the optical signal to the satellite 104c without first demodulating the optical signal.

Further, the terrestrial control system 150 can control the operation of the satellite communications network 100. For example, the terrestrial control system 150 can be communicatively coupled to each of the satellites 104a-104c (e.g., through one or more of the terrestrial nodes 102a and 102b, or using an RF transceiver 108c similar to those of the terrestrial nodes 102a and 102b). Further, the terrestrial control system 150 can transmit instructions or commands to control the satellites 104a-104c. For example, the terrestrial control system 150 can instruct each of the satellites 104a-104c to navigate or position itself in a particular manner (e.g., to control the orbits and/or orientations or the satellites 104a-104c). As another example, the terrestrial control system 150 can instruct each of the satellites 104a-104c to communicate with or more other specified satellites.

For instance, the terrestrial control system 150 can instruct each of the satellites to receive data from one or more particular satellites. As an example, the terrestrial control system 150 can instruct a first satellite to orient signal reception equipment of the first satellite in a particular direction, such that the first satellite receives signals from a second satellite. Further, the terrestrial control system 150 can instruct the first satellite to process the received signals in a particular manner to recover data encoded in the received signals.

Further, the terrestrial control system 150 can instruct each of the satellites to transmit data to one or more particular satellites. As an example, the terrestrial control system 150 can instruct a first satellite to encode data into a signal in a particular manner, such that it can be interpreted by a second satellite. Further, the terrestrial control system 150 can instruct the first satellite to orientation transmission equipment of the first satellite in a particular direction, and transmit the signals to the second satellite.

Figure 19:
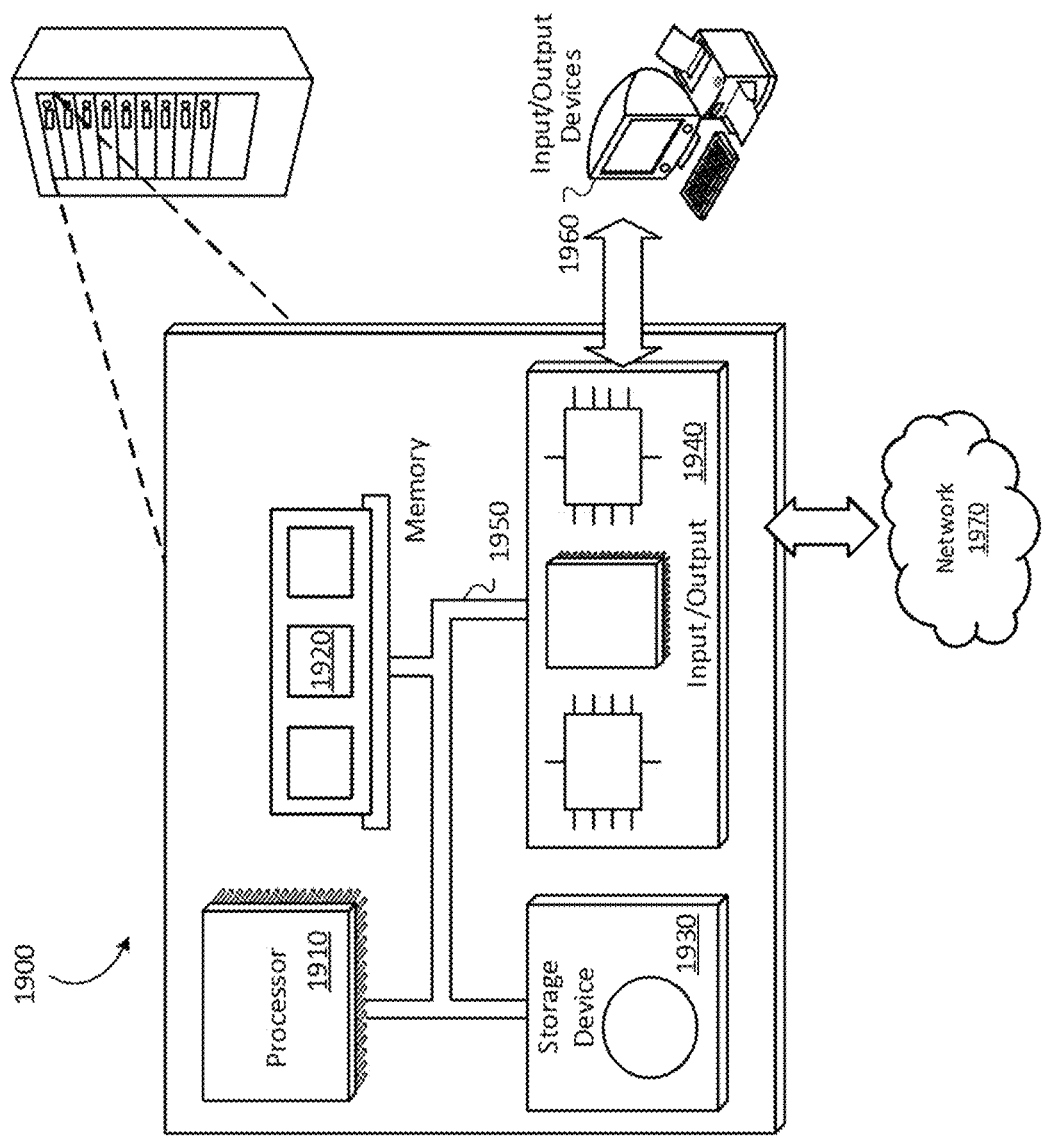
FIG. 19 is a diagram of an example computer system.

The terrestrial control system 150 can be implemented at least in part using one or more of the computer systems (e.g., the computer system 1900 shown in FIG. 19).

Although FIG. 1A shows an example satellite communications network 100 having two terrestrial nodes 102a and 102b and three satellite 104a-104c, this is merely an illustrative example. In practice, a satellite communications network 100 can include any number of terrestrial nodes (e.g., one, two, three, or more). Further, a satellite communication network 100 can include any number of satellites (e.g., one, two, three, or more).

In some implementations, a first satellite of the satellite communications network 100 can transmit data to multiple second satellites of the satellite communications network 100 concurrently, such that similar data is "multicast" or "shared cast" to multiple satellites at the same time. Upon receipt of the data, each of the second satellites can selectively retain or recover one or more portions of the data (e.g., the portions of the data that are intended for the satellite or the terrestrial nodes to which it is communicatively coupled) and discard one or more other portions of the data (e.g., the portions of the data that are intended for other satellites or the terrestrial nodes to which they are communicatively coupled).

Figure 2:
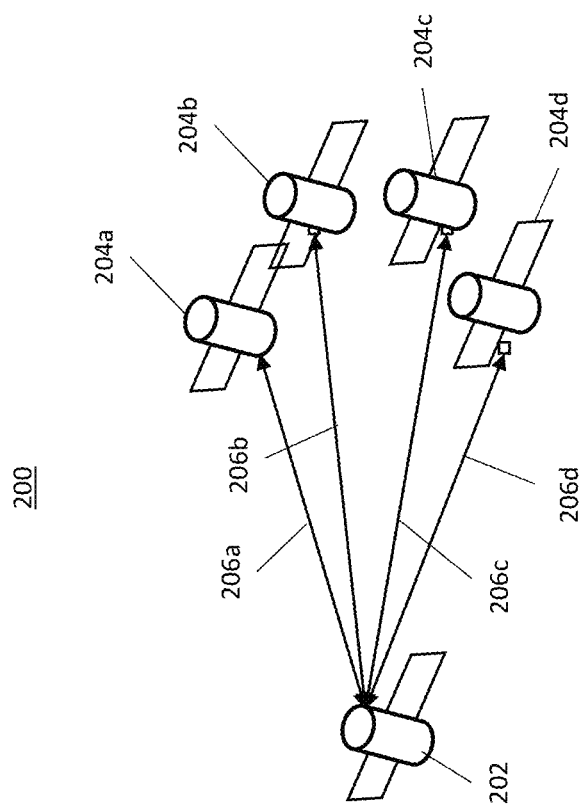
FIG. 2 is a diagram of an example constellation of satellites.

As an example, FIG. 2 shows an example constellation 200 of satellites. In general, each of the satellites of the constellation 200 can be similar to those described above (e.g., with reference to FIG. 1A). In this example, a first satellite 202 can transmit data to multiple second satellites 204a-204d concurrently. For example, the first satellite 202 can transmit the same (or substantially similar) optical signals 206a-206d to each of the second satellites 204a-204d concurrently. Upon receipt of a respective one of the optical signals 206a-20d, each of the second satellites 204a-204d can selectively retain or recover one or more portions of the data contained within the received optical signal (e.g., the portions of the data that are intended for that satellite and/or the terrestrial nodes to which it is communicatively coupled) and discard one or more other portions of the data (e.g., the portions of the data that are intended for other satellites and/or the terrestrial nodes to which they are communicatively coupled).

Although FIG. 2 shows an exchange of data between five satellites concurrently (e.g., one satellite exchanging data with a group of four satellites), in practice, data can be exchanged between any number of satellites. For example, a satellite can exchange data with one, two, three, four, five, or more other satellites concurrently. Further, in turn, each of the satellites can exchange data with one or more additional satellites (e.g., to form a chain of communicatively interlinked satellites or a mesh network).

In some implementations, at least some of optical transceivers in a constellation of satellites can have capabilities different from the capabilities of other optical transceivers in the constellation. For example, a first satellite can include a first optical transceiver for exchanging data with each of several second satellites, and each of the second satellites can include a respective second optical transceiver for exchanging data to the first satellite. Further, the first optical transceiver can have a greater bandwidth or data capacity than that of each of the second optical transceivers. Accordingly, the first optical transceiver can transmit data to each of those second optical transceivers according to a higher bit rate, and each of those second optical transceivers can transmit data to the first optical transceiver according to a lower bit rate. Thus, downstream data (e.g., from the first satellite to the second satellites) can be transmitted according to a relatively large pooled or shared allocation of bandwidth, whereas upstream data (e.g., from each of the second satellites to the first satellites) can be transmitted according to respective smaller dedicated allocations of bandwidth.

Figure 3:
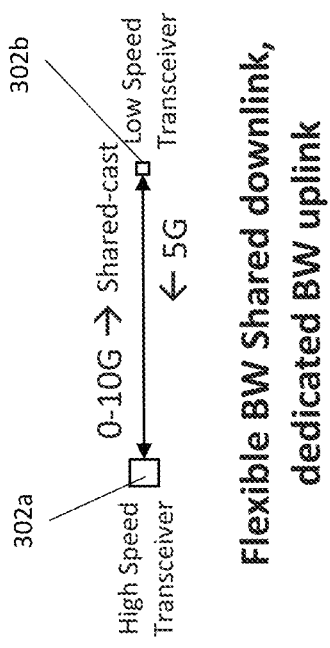
FIG. 3 is a diagram of an example arrangement of optical transceivers.

As an example, FIG. 3 shows two optical transceivers 302a and 302b. In general, the optical transceivers 302a and 302b can be similar to the optical transceivers 114a-114c described above (e.g., with reference to FIG. 1A). In this example, the optical transceiver 302a is a "high speed" optical transceiver, and can transmit data to one or more other optical transceivers (e.g., one or more of the optical transceivers 302b) concurrently according to a combined or shared bandwidth of up to 10 Gbit/s. Further, the optical transceiver 302b is a "low speed" optical transceiver, and can transmit data to one other optical transceiver (e.g., the optical transceiver 302a) according to a dedicated bandwidth of 5 GBit/s. Although example bandwidths are described above, these are merely illustrative examples. In practice, each optical transceiver can have a bandwidth different from those mentioned above, depending on the implementation.

Figure 4B:
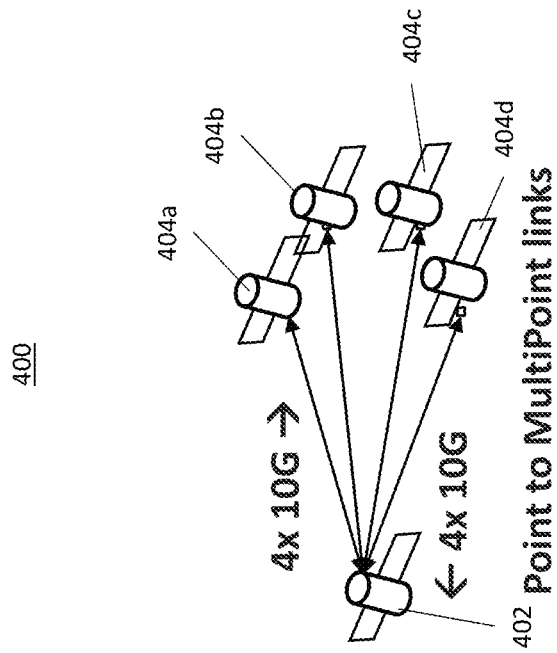
FIGS. 4A and 4B are diagrams of additional example constellations of satellites.
Figure 4A:
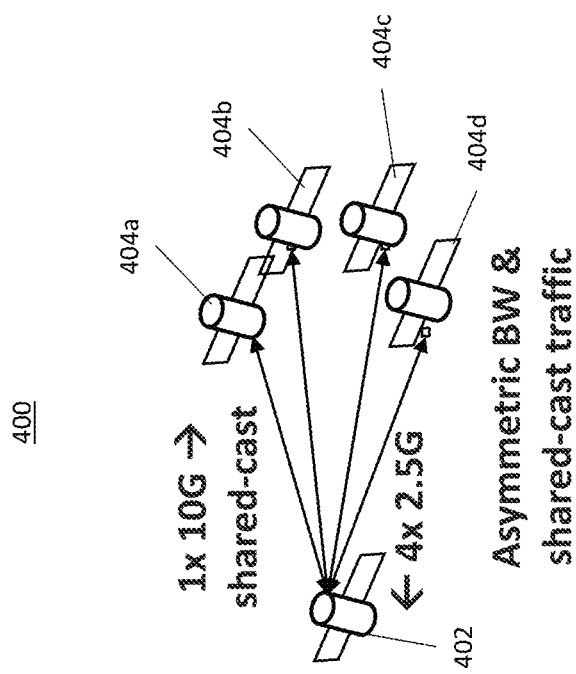

The foregoing asymmetric configuration enables data to be transmitted between satellites according to different pooled allocations of bandwidth. For example, FIG. 4A shows an example constellation 400 of satellites. In general, each of the satellites of the constellation 400 can be similar to those described above (e.g., with reference to FIG. 1A). In this example, a first satellite 402 is equipped with an optical transceiver having a relatively higher bandwidth or data capacity (e.g., compared to those of several second satellites 404a-404d), such that it can transmit data to the second satellites 404a-404d concurrently according to a shared bandwidth of up to 10 Gbit/s. For example, the first satellite 402 can transmit data intended for each of the second satellites 404a-404d according to the same bandwidth (e.g., 2.5 Gbit/s to each). As another example, the first satellite 402 can transmit data intended for each of the second satellites according to different respective bandwidths. For instance, the first satellite 402 can transmit data intended for the satellite 404a according to a bandwidth of 5 GBit/s, transmit data intended for the satellite 404b according to a bandwidth of 2.5 GBit/s, transmit data intended for the satellite 404c according to a bandwidth of 1.25 GBit/s, and transmit data intended for the satellite 404d according to a bandwidth of 1.25 GBit/s.

Further, this data transmission can be performed by modulating an optical signal such that it includes information indicative of the data intended for each of the satellites 404a-404b, and transmitting the same (or substantially similar) optical signal from the first satellite 402 to each of the second satellites 404a-404d concurrently. The satellite 404a can be associated with a first group of optical subcarriers, the satellite 404b can be associated with a second group of optical subcarriers, the satellite 404c can be associated with a third group of optical subcarriers, and satellite 404d can be associated with a fourth group of optical subcarriers, where each of the groups of optical subcarriers is different from each other group of optical subcarriers. In some implementations, the groups of optical subcarriers can be assigned to each of the satellite 404a-404d, such as by the terrestrial control system 150. In some implementations, a group of optical subcarriers can include a single optical subcarrier. In some implementations, a group of optical subcarriers can include a multiple optical subcarriers. In some implementations, each optical subcarrier can enable data to be transferred according to a particular bandwidth, and assignment of multiple optical subcarriers to a group can facilitate the transmission of data according to a larger bandwidth (e.g., compared to the transmission of data using a single optical subcarrier or a smaller number of optical subcarriers). As described above, at least some of the optical sub carriers can be Nyquist subcarriers.

For instance, the first satellite 402 can modulate an optical signal (e.g., a carrier signal) according to the first group of optical subcarriers, such that the optical signal carries information indicative of a first portion of data intended for the satellite 404a and/or the terrestrial nodes to which the satellite 404a is communicatively coupled. Further, the first satellite 402 can modulate the optical signal according to the second group of optical subcarriers, such that the optical signal also carries information indicative of a second portion of data intended for the satellite 404b and/or the terrestrial nodes to which the satellite 404b is communicatively coupled. Further, the first satellite 402 can modulate the optical signal according to the third group of optical subcarriers, such that the optical signal further also carries information indicative of a third portion of data intended for the satellite 404c and/or the terrestrial nodes to which the satellite 404c is communicatively coupled. Further, the first satellite 402 can modulate the optical signal according to the fourth group of optical subcarriers, such that the optical signal further also carries information indicative of a fourth portion of data intended for the satellite 404d and/or the terrestrial nodes to which the satellite 404d is communicatively coupled. The first satellite 402 can transmit instances or copies of the modulated optical signal to each of the second satellites 404a-40d concurrently.

Upon receipt of an instance of the optical signal, each of the second satellites 404a-404d selectively can retain or recover one or more portions of the data contained within the received optical signal (e.g., the portions of the data that are intended for that satellite and/or the terrestrial nodes to which it is communicatively coupled) and discard or otherwise ignore one or more other portions of the data (e.g., the portions of the data that are intended for other satellites and/or the terrestrial nodes to which they are communicatively coupled). For example, the first satellite 404a can demodulate the received instance of the optical signal according to the first group of optical subcarriers to recover information indicative of the first portion of data. Further, the second satellite 404b can demodulate the received instance of the optical signal according to the second group of optical subcarriers to recover information indicative of the second portion of data. Further, the third satellite 404c can demodulate the received instance of the optical signal according to the third group of optical subcarriers to recover information indicative of the third portion of data. Further, the fourth satellite 404d can demodulate the received instance of the optical signal according to the fourth group of optical subcarriers to recover information indicative of the fourth portion of data.

Further, in this example, each of the second satellites 404a-404d is equipped with an optical transceiver having a relatively lower bandwidth or data capacity (e.g., compared to that of the optical transceiver of first satellite 402), such that each of the second satellites 404a-404d can transmit data to the first satellite 402 according to a lower dedicated bandwidth of 2.5 Gbit/s.

Although example bandwidths are described above, these are merely illustrative examples. In practice, each optical transceiver can have a bandwidth different from those mentioned above, depending on the implementation. Further, although FIG. 4A shows an exchange of data between five satellites concurrently (e.g., one satellite exchanging data with a group of four satellites), in practice, data can be exchanged between any number of satellites. For example, a satellite can exchange data with one, two, three, four, five, or more other satellites concurrently. Further, in turn, each of the satellites can exchange data with one or more additional satellites (e.g., to form a chain of communicatively interlinked satellites or a mesh network).

In the example shown in FIG. 4A, the first satellite 402 transmits the same (or substantially similar) optical signal to each of the second satellites 404a-404d concurrently. However, in some implementations, the first satellite 402 can transmit different optical signals to each of the second satellites 404a-404d (e.g., each optical signal carrying data intended for a different respective second satellite). As an example, as shown in FIG. 4B, as shown in FIG. 4B, the first satellite 402 can transmit data to each of the second satellites 404a-404d according to a respective dedicated bandwidth (e.g., 10 GBit/s each). Similarly, each of the second satellites 404a-404d can transmit data to the first satellite 402 according to a respective dedicated bandwidth (e.g., 10 GBit/s each).

In some implementations, a satellite can include multiple transceivers for transmitting data to and/or receiving data from one or more other satellites. This can be beneficial, for example, in establishing multiple communications links between pairs of satellites.

Figure 5B:
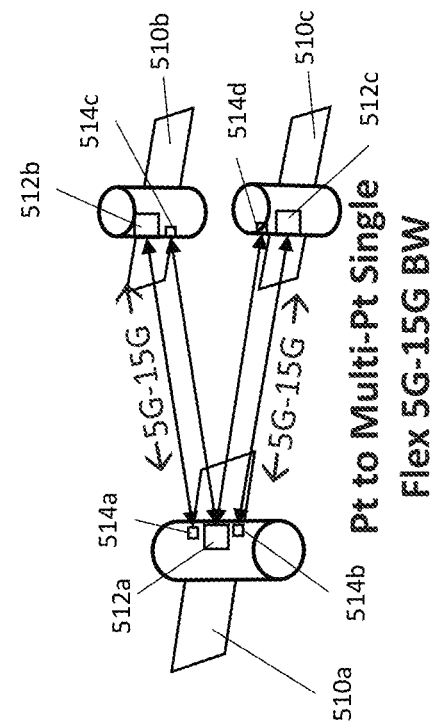
FIGS. 5A-5E are diagrams of additional example constellations of satellites.
Figure 5D:
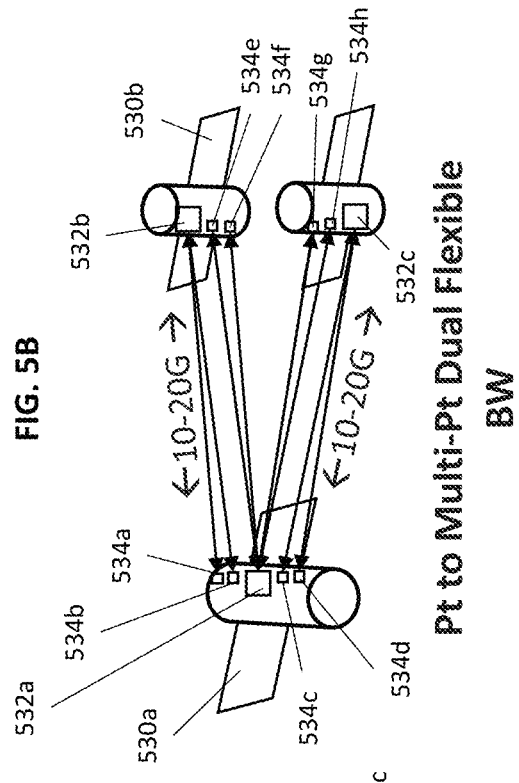
Figure 5A:
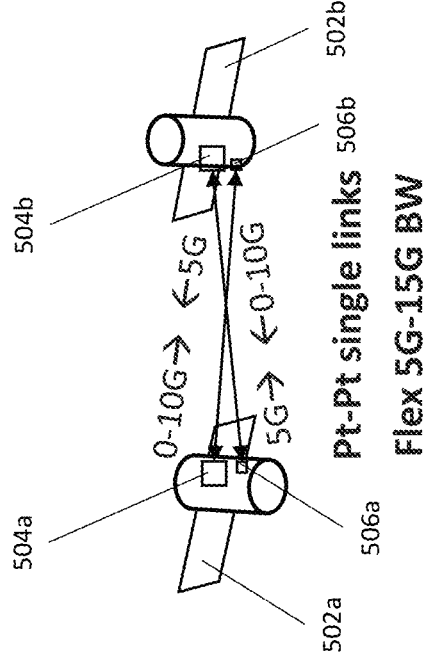

As an example, FIG. 5A shows a satellite 502a and a satellite 502b. In general, each of the satellites 502a and 502b can be similar to those described above (e.g., with reference to FIG. 1A). However, in this example, the satellite 502a includes a first transceiver 504a having a higher bandwidth or data capacity (e.g., capable of transmitting data according to a bandwidth of up to 10 GBit/s), and a second transceiver 506a having a lower bandwidth or data capacity (e.g., capable of transmitting data according to a bandwidth of up to 5 GBit/s). Similarly, the satellite 502b includes a first transceiver 504b having a higher bandwidth or data capacity (e.g., capable of transmitting data according to a bandwidth of up to 10 GBit/s), and a second transceiver 506b having a lower bandwidth or data capacity (e.g., capable of transmitting data according to a bandwidth of up to 5 GBit/s).

The first transceiver 504a of the first satellite 502a is communicatively coupled to the second transceiver 506b of the second satellite 502a. In this configuration, the first satellite 502a can transmit data to the second satellite 502a and/or one more additional satellites according to a shared bandwidth of up to 10 GBit/s. For ease of illustration, the one or more additional satellites are not shown in FIG. 5A. Further, the second satellite 502b can transmit data to the first satellite 502a according to a dedicated bandwidth of 5 GBit/s.

Further, the second transceiver 506a of the first satellite 502a is communicatively coupled to the first transceiver 504b of the second satellite 502b. In this configuration, the first satellite 502a can transmit data to the second satellite 502b according to a dedicated bandwidth of 5 GBit/s. Further, the second satellite 502b can transmit data to the first satellite 502a and/or one more additional satellites according to a shared bandwidth of 10 GBit/s. For ease of illustration, the one or more additional satellites are not shown in FIG. 5A.

Accordingly, each satellite 504a and 504b can exchange data with the other satellite 504a and 504b using both a dedicated 5 Gbit/s communications link and a shared 10 GBit/s communications link.

As another example, FIG. 5B shows a satellite 510a, a satellite 510b, and a satellite 510c. In general, each of the satellites 510a-510c can be similar to those described above (e.g., with reference to FIG. 1A). However, in this example, the satellite 510a includes a first transceiver 512a having a higher bandwidth or data capacity (e.g., capable of transmitting data according to a bandwidth of up to 10 GBit/s), and two second transceivers 514a and 514b each having a lower bandwidth or data capacity (e.g., capable of transmitting data according to a bandwidth of up to 5 GBit/s). Further, the satellite 510b includes a first transceiver 512b having a higher bandwidth or data capacity (e.g., capable of transmitting data according to a bandwidth of up to 10 GBit/s), and a second transceiver 514c having a lower bandwidth or data capacity (e.g., capable of transmitting data according to a bandwidth of up to 5 GBit/s). Similarly, the satellite 510c includes a first transceiver 512c having a higher bandwidth or data capacity (e.g., capable of transmitting data according to a bandwidth of up to 10 GBit/s), and a second transceiver 514d having a lower bandwidth or data capacity (e.g., capable of transmitting data according to a bandwidth of up to 5 GBit/s).

The first transceiver 512a of the first satellite 510a is communicatively coupled to the second transceiver 514c of the second satellite 510b, the second transceiver 514d of the third satellite 510c, and in some cases, one or more additional satellites. For ease of illustration, the one or more additional satellites are not shown in FIG. 5B. In this configuration, the first satellite 510a can transmit data to the second satellite 510b, the third satellite 510c, and/or the one or more additional satellites according to a shared bandwidth of up to 10 GBit/s. Further, the second satellite 510b can transmit data to the first satellite 510a according to a dedicated bandwidth of 5 GBit/s, and the third satellite 510c can transmit data to the first satellite 510a according to a dedicated bandwidth of 5 GBit/s.

Further, one of the second transceivers 514a of the first satellite 510a is communicatively coupled to the first transceiver 512b of the second satellite 510b. In this configuration, the first satellite 510a can transmit data to the second satellite 510b according to a dedicated bandwidth of 5 GBit/s. Further, the second satellite 510b can transmit data to the first satellite 510a and/or one more additional satellites according to a shared bandwidth of 10 GBit/s. For ease of illustration, the one or more additional satellites are not shown in FIG. 5B.

Further, the other one of the second transceivers 514b of the first satellite 510a is communicatively coupled to the first transceiver 512c of the third satellite 510b. In this configuration, the first satellite 510a can transmit data to the third satellite 510c according to a dedicated bandwidth of 5 GBit/s. Further, the third satellite 510c can transmit data to the first satellite 510a and/or one more additional satellites according to a shared bandwidth of 10 GBit/s. For ease of illustration, the one or more additional satellites are not shown in FIG. 5B.

Accordingly, the first satellite 510a can exchange data with the second satellite 510b using both a dedicated 5 Gbit/s communications link and a shared 10 GBit/s communications link. Similarly, the first satellite 510a can exchange data with the third satellite 510c using both a dedicated 5 Gbit/s communications link and a shared 10 GBit/s communications link.

Figure 5C:
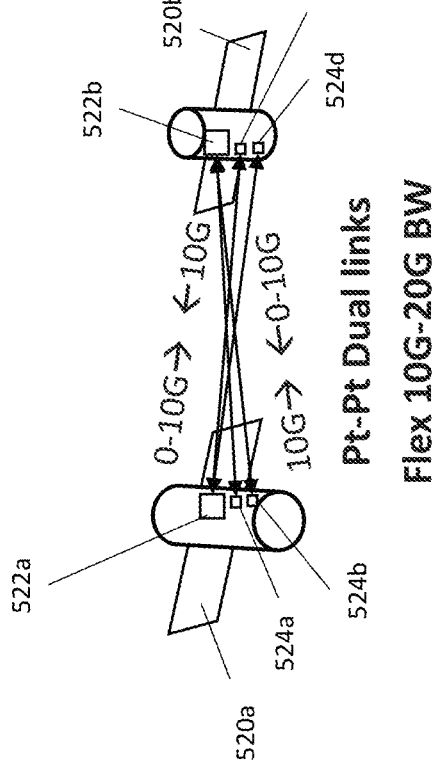

As another example, FIG. 5C shows a satellite 520a and a satellite 520b. In general, each of the satellites 520a and 520b can be similar to those described above (e.g., with reference to FIG. 1A). However, in this example, the satellite 520a includes a first transceiver 522a having a higher bandwidth or data capacity (e.g., capable of transmitting data according to a bandwidth of up to 10 GBit/s), and two second transceivers 524a and 524b each having a lower bandwidth or data capacity (e.g., capable of transmitting data according to a bandwidth of up to 5 GBit/s). Further, the satellite 520b includes a first transceiver 522b having a higher bandwidth or data capacity (e.g., capable of transmitting data according to a bandwidth of up to 10 GBit/s), and two second transceivers 524c and 524d each having a lower bandwidth or data capacity (e.g., capable of transmitting data according to a bandwidth of up to 5 GBit/s).

The first transceiver 522a of the first satellite 520a is communicatively coupled to both of the second transceivers 524c and 524d of the second satellite 520b, and in case cases, one or more additional satellites. For ease of illustration, the one or more additional satellites are not shown in FIG. 5B. In this configuration, the first satellite 520a can transmit data to the second satellite 520b and/or the one or more other satellites according to a shared bandwidth of up to 10 GBit/s. Further, the second satellite 520b can transmit data to the first satellite 520a according to a dedicated bandwidth of 10 GBit/s (e.g., two dedicated 5 Gbit/s channels).

Further, the first transceiver 522b of the second satellite 520b is communicatively coupled to both of the second transceivers 524a and 524a of the first satellite 520a, and in some cases, one or more additional satellites. For ease of illustration, the one or more additional satellites are not shown in FIG. 5B. In this configuration, the second satellite 520b can transmit data to the first satellite 520a and/or the one or more other satellites according to a shared bandwidth of up to 10 GBit/s. Further, the first satellite 520a can transmit data to the second satellite 520b according to a dedicated bandwidth of 10 GBit/s (e.g., two dedicated 5 Gbit/s channels).

Accordingly, each satellite can exchange data with the other satellite using two dedicated 5 Gbit/s communications link and a shared 10 GBit/s communications link.

As another example, FIG. 5D shows a satellite 530a, a satellite 530b, and a satellite 530c. In general, each of the satellites 530a-530c can be similar to those described above (e.g., with reference to FIG. 1A). However, in this example, the satellite 530a includes a first transceiver 532a having a higher bandwidth or data capacity (e.g., capable of transmitting data according to a bandwidth of up to 10 GBit/s), and four second transceivers 534a-534d having a lower bandwidth or data capacity (e.g., capable of transmitting data according to a bandwidth of up to 5 Gbit/s). Further, the satellite 530b includes a first transceiver 532b having a higher bandwidth or data capacity (e.g., capable of transmitting data according to a bandwidth of up to 10 GBit/s), and two second transceivers 534e and 534f each having a lower bandwidth or data capacity (e.g., capable of transmitting data according to a bandwidth of up to 5 GBit/s). Further, the satellite 530c includes a first transceiver 532c having a higher bandwidth or data capacity (e.g., capable of transmitting data according to a bandwidth of up to 10 GBit/s), and two second transceivers 534g and 534h each having a lower bandwidth or data capacity (e.g., capable of transmitting data according to a bandwidth of up to 5 GBit/s).

The first transceiver 532a of the first satellite 530a is communicatively coupled to both of the second transceivers 534e and 534f of the second satellite 530b and both of the second transceivers 534g and 534h of the third satellite 530c. Further, in some cases, the transceiver 532a of the first satellite 530a can be communicatively coupled to one or more additional satellites. For ease of illustration, the one or more additional satellites are not shown in FIG. 5B. In this configuration, the first satellite 530a can transmit data to the second satellite 530b, the third satellite 530c, and/or the one or more additional satellites according to a shared bandwidth of up to 10 GBit/s. Further, the second satellite 530b can transmit data to the first satellite 530a according to a dedicated bandwidth of 10 GBit/s (e.g., two dedicated 5 Gbit/s channels), and the third satellite 530c can transmit data to the first satellite 530a according to a dedicated bandwidth of 10 GBit/s (e.g., two dedicated 5 Gbit/s channels).

Further, two of the second transceivers 534a and 534b of the first satellite 530a are communicatively coupled to the first transceiver 532b of the second satellite 530b. In this configuration, the first satellite 530a can transmit data to the second satellite 530b according to a dedicated bandwidth of 10 GBit/s (e.g., two dedicated 5 Gbit/s channels). Further, the second satellite 530b can transmit data to the first satellite 530a and/or one more additional satellites according to a shared bandwidth of 10 GBit/s.

Further, the other two of the second transceivers 534c and 534d of the first satellite 530a are communicatively coupled to the first transceiver 532c of the third satellite 530c. In this configuration, the first satellite 530a can transmit data to the third satellite 530c according to a dedicated bandwidth of 10 GBit/s (e.g., two dedicated 5 Gbit/s channels). Further, the third satellite 530c can transmit data to the first satellite 530a and/or one more additional satellites according to a shared bandwidth of 10 GBit/s.

Accordingly, the first satellite 530a can exchange data with the second satellite 530b using two dedicated 5 Gbit/s communications links and a shared 10 GBit/s communications link. Similarly, the first satellite 530a can exchange data with the third satellite 530c using both a dedicated 5 Gbit/s communications link and a shared 10 GBit/s communications link.

Figure 5E:
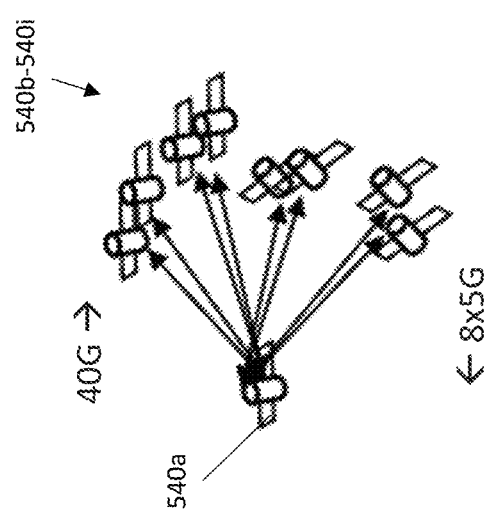

Although example bandwidths are described above, these are merely illustrative examples. In practice, each optical transceiver can have a different bandwidth, depending on the implementation. Although FIGS. 5A-5D shows an exchange of data between two or three satellites concurrently, in practice, data can be exchanged between any number of satellites. For example, a satellite can exchange data with one, two, three, four, five, or more other satellites concurrently. As an example, as shown in FIG. 5E, a satellite 540a can transmit the same (or substantially the same) optical signal to each of eight other satellites 540b-540i (e.g., according to a shared bandwidth of 40 GBit/s). Each of the satellites 540b-540i can receive and inspect the received optical signal, process only the data addressed to the respective satellite, and discard the data addressed to other satellites. Further, each of the satellites 540b-540i can transmit a respective optical signal to the satellite 540a (e.g., according to a dedicated bandwidth of 5 Gbit/s). Further, in turn, each of the satellites can exchange data with one or more additional satellites (e.g., to form a chain of communicatively interlinked satellites or a mesh network).

As described above, each satellite can be assigned a respective group of optical subcarriers (e.g., by the terrestrial control system 150). Data can be transmitted to a particular satellite by modulating an optical signal according to the group of optical subcarriers that are assigned to that satellite (e.g., such that the optical signal includes information indicative of the data intended for that satellite), and transmitting the modulated optical signal to that satellite. In turn, the satellite can demodulate the received optical signal according to the assigned group of optical subcarriers to recover the data.

Further, as described above, a first satellite can transmit data to several other satellites by modulating an optical signal according to several groups of optical subcarriers (e.g., such that it includes information indicative of the data intended for each of the recipient satellites), and transmitting the same (or substantially similar) optical signal from the first satellite to each of the recipient satellites concurrently.

Further, each optical subcarrier can enable data to be transferred according to a particular bandwidth, and assignment of multiple optical subcarriers to a group can facilitate the transmission of data according to a larger bandwidth. For example, a single optical subcarrier may enable data to be transmitted according to a particular bandwidth (e.g., 5 Gbit/s). Accordingly, a satellite that has been assigned a single optical subcarrier can receive data according to a lower bandwidth (e.g., 5 GBit/s), whereas a satellite that has been assigned two optical subcarriers can receive data according to a higher bandwidth (e.g., 10 GBit/s). In practice, each satellite can be assigned any number of optical subcarriers (e.g., one, two, three, or more).

Figure 6:
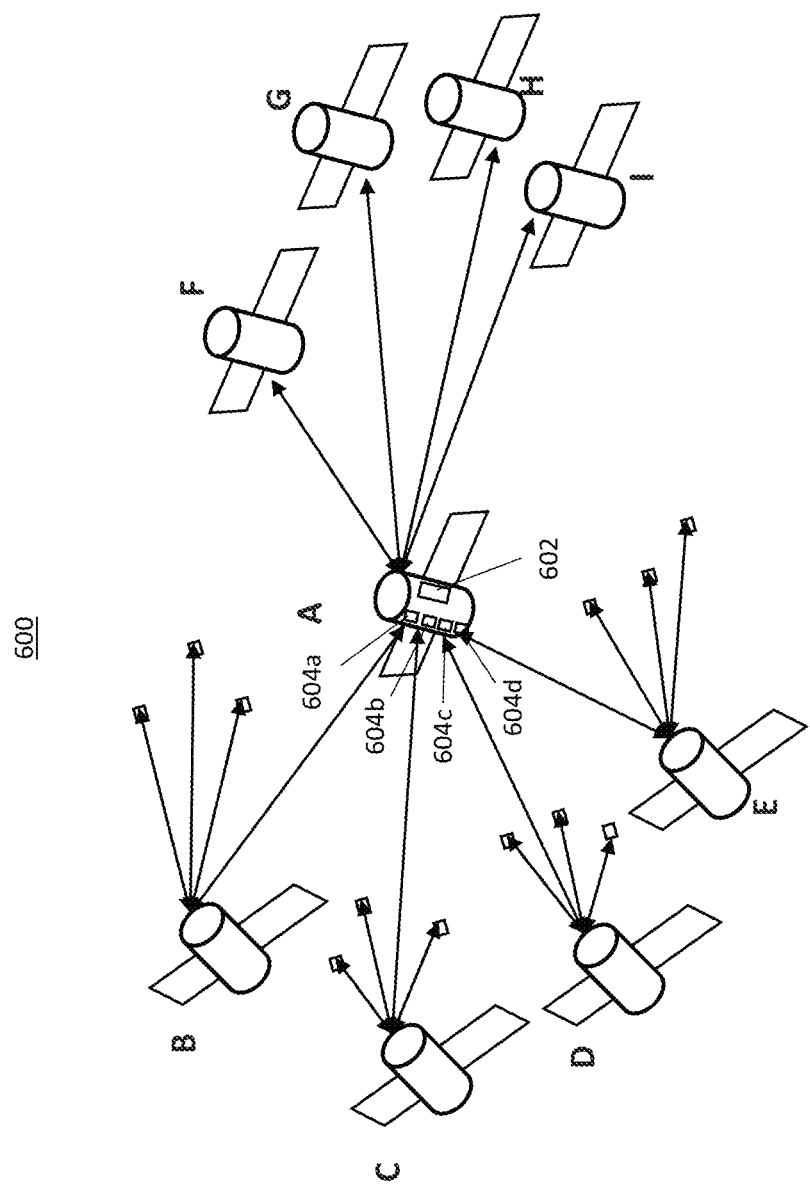
FIG. 6 is a diagram of an additional example constellation of satellites.

As an example, FIG. 6 shows a constellation 600 of satellites (labeled A to I). In this example, each of the satellites A-I includes a respective high speed transceiver 602 that is capable of transmitting data using a single respective carrier signal having eight respective optical subcarriers, where each optical subcarrier enables data to be transmitted according to a bandwidth of 5 GBit/s. Accordingly, each satellite can transmit and/or receive data using its high speed transceiver 604 according to bandwidth of 40 GBit/s. For ease of illustration, the high speed transceiver 602 for satellites B-I are not shown in FIG. 6.

Further, each of the satellites A-I also includes four respective low speed transceivers 604a-604d. Each of the low speed transceivers 604a-604d is capable of transmitting data using a single respective carrier signal having two respective optical subcarriers, where each optical subcarrier enables data to be transmitted according to a bandwidth of 5 GBit/s. Accordingly, each satellite can transmit and/or receive data using a low speed transceiver 604a-604d according to bandwidth of 10 GBit/s. For ease of illustration, the low speed transceivers 604a-604d for satellites B-I are not shown in FIG. 6.

In this example, the satellite A transmits data to the satellites F-I using its high speed transceiver 602. In particular, the satellite A modulates an optical signal (e.g., a carrier signal) according to the eight optical subcarriers that are available to the high speed transceiver 602, such that the data is carried on each of the optical subcarriers. Further, the satellite A transmits the same (or substantially the same) modulated optical signal to each of the satellites F-I (e.g., such that data is transmitted according to a shared bandwidth of 40 Gbit/s). In some implementations, each pair of optical subcarriers carries information indicative of data intended for a different one of the satellites F-I (e.g., such that the 40 GBit/s bandwidth is shared equally among the satellites F-I, such as 10 GBit/s each). In some implementations, three or more optical subcarriers can carry information indicative of data intended for a particular one of the satellites F-I (e.g., such that a particular one of the satellites is allotted a larger share of the 40 GBit/s bandwidth). Upon receipt of the optical signal, each of the satellites F-I can selectively demodulate the optical signal according to the optical subcarrier or optical subcarriers that were assigned to that satellite, and recovers the data that was intended for that satellite. As described above, in some implementations, optical subcarriers can be assigned to each of the satellites by the terrestrial control system 150 (e.g., as shown in FIG. 1A).

Further, in this example, the satellite A receives data from each of the satellites B-E using a respective low speed transceiver 604a-604d. In particular, the satellite A receives four optical signals from the satellite B-E using respective ones of the low speed transceivers 604a-604d. Each of the optical signals can be transmitted using a high speed transceiver 602 of a respective one of the satellites B-E. Each of these optical signals can be transmitted in a similar manner as described above. For example, each of the satellite B-E can transmit a respective optical signal to four other satellites (e.g., according to a multi-cast or shared cast technique, as described above), one of which is the satellite A. Further, in a similar manner as described above, each of the optical signals can be modulated according to eight respective optical subcarriers that are available to the respective high speed transceiver that transmitted it, such that the data is carried on each of the optical subcarriers. The satellite A demodulates each of the optical signals according to a different pair of optical subcarriers (e.g., the pair of optical subcarriers that were used by the satellites B-E to carry information intended for the satellite A), and recovers the data that was intended for the satellite A. Accordingly, the satellite A receives data from each of the satellites B-E according to a bandwidth of 10 Gbit/s, respectively. As described above, in some implementations, optical subcarriers can be assigned to each of the satellites by the terrestrial control system 150 (e.g., as shown in FIG. 1A).

Although example bandwidths are described above, these are merely illustrative examples. In practice, each optical transceiver can have a different bandwidth, depending on the implementation. Although FIG. 6 shows an exchange of data between 9 satellites, in practice, data can be exchanged between any number of satellites. Further, in turn, each of the satellites can exchange data with one or more additional satellites (e.g., to form a chain of communicatively interlinked satellites or a mesh network). For example, the configuration shown in FIG. 6 can be repeated one or more times to form a mesh network of satellites.

As described above, each optical subcarrier can enable data to be transferred according to a particular bandwidth, and assignment of multiple optical subcarriers to a satellite or transceiver can facilitate the transmission of data according to a larger bandwidth. Further, the assignment of optical subcarriers can be modified dynamically during operation of the satellite communications network. This can be beneficial, for example, as it enables the capacity of each communications link to be adjusted based on network conditions. For instance, if a large amount of data is or will be transferred between two satellites, additional optical subcarriers can be assigned to the communications link between those satellites to provide more bandwidth for the transmission. The additional optical subcarriers can be reassigned, for example, from communications links between other satellites that are experiencing a smaller network load. As described above, in some implementations, optical subcarriers can be assigned to each of the satellites by the terrestrial control system 150 (e.g., as shown in FIG. 1A).

Figure 7B:
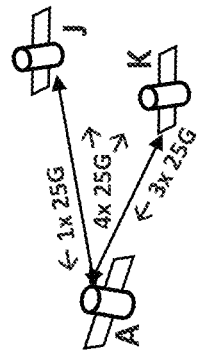
FIGS. 7A and 7B are diagrams of additional example constellations of satellites.
Figure 7A:
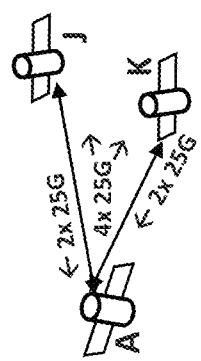

As an example, FIGS. 7A and 7B shows a reassignment of optical subcarriers between satellites. In this example, a satellite A transmits data to, and receives data from, each of a satellite J and a satellite K. Further, eight optical subcarriers for available for the exchange of data, each enabling data to be exchanged according to a bandwidth of 25 Gbit/s.

As shown in FIG. 7A, four optical subcarriers can be assigned for the transmission of data from the satellite A and to the satellites J and K (e.g., according to a shared bandwidth of 100 GBit/s). Further, two optical subcarriers can be assigned for the transmission of data from the satellite J and to the satellite A (e.g., according to a dedicated bandwidth of 50 GBit/s). Further, two optical subcarriers can be assigned for the transmission of data from the satellite K and to the satellite A (e.g., according to a dedicated bandwidth of 50 GBit/s).

As shown in FIG. 7B, one of the optical subcarriers assigned to the transmission of data from the satellite J and to the satellite A can be reassigned to the transmission of data from the satellite K and to the satellite A. According to this configuration, one optical subcarrier is be assigned for the transmission of data from the satellite J and to the satellite A (e.g., according to a dedicated bandwidth of 25 GBit/s). Further, three optical subcarriers are assigned for the transmission of data from the satellite K and to the satellite A (e.g., according to a dedicated bandwidth of 75 GBit/s).

Although an example reassignment of optical subcarriers is described above, this is merely an illustrative example. In practice, optical subcarriers can be reassigned in any manner to adjust the resources that are available for transmitting data between any number of satellites.

In some implementations, each optical subcarrier can be assigned to the transmission of data from one particular satellite to another. This can be beneficial, for example, as it enables the recipient satellite to receive a modulated optical signal, and demodulate that optical signal according to the assigned optical subcarrier to recover only the data that was intended for the recipient satellite.

For example, four optical subcarriers SC1-SC4 may be available for transmission by a satellite A, where the optical subcarrier SC1 is assigned for the transmission of data from the satellite A to a satellite B, the optical subcarrier SC2 is assigned for the transmission of data from the satellite A to a satellite C, the optical subcarrier SC3 is assigned for the transmission of data from the satellite A to a satellite, D and the optical subcarrier SC4 is assigned for the transmission of data from the satellite A to a satellite E. Although an optical signal transmitted by the first satellite to each of the satellites B-E may be modulated according to all four optical subcarriers SC1-SC4, each satellite B-E can selectively demodulate the optical signal according to a different respective optical subcarrier to recover the data that was intended for it. For example, the satellite B can demodulate the optical signal according to the optical subcarrier SC1, the satellite C can demodulate the optical signal according to the optical subcarrier SC2, the satellite D can demodulate the optical signal according to the optical subcarrier SC3, and the satellite E can demodulate the optical signal according to the optical subcarrier SC4.

However, in some implementations, a set of optical subcarriers can be assigned to the transmission of data from one satellite to multiple other satellites. Each of the recipient satellites can demodulate an optical signal according to the set of optical subcarriers to recover the data carried by that set of optical subcarriers, and inspect the data to determine whether the data was intended for it. If the data was not intended for that satellite, the satellite can discard or ignore the data. If the data was intended for that satellite, the satellite can retain the data for further processing. This can be beneficial, for example, as it enables multiple satellites to receive data according to a shared pool of bandwidth.

For example, four optical subcarriers SC1-SC4 may be available for transmission by a satellite A, where the optical subcarriers SC1 and SC2 are assigned for the transmission of data from the satellite A to a satellite B and/or the satellite C, and the optical subcarriers SC3 and SC4 are assigned for the transmission of data from the satellite A to a satellite D and/or the satellite E. Although an optical signal transmitted by the first satellite to each of the satellites B-E may be modulated according to all four optical subcarriers SC1-SC4, each satellite B-E can demodulate the optical signal selectively according to its assigned pair of optical subcarrier, and retain the data upon determining that the data was intended for that satellite.

For example, the satellite B can demodulate the optical signal according to the optical subcarriers SC1 and SC2 to recover data carried on those optical subcarriers. Further, the satellite B can inspect the recovered data (e.g., a destination header or other field in a data packet) to determine the intended destination of the data. If the data was intended for the satellite B, the satellite B can retain the data for further processing. If the data was intended for the satellite C (e.g., the other satellite to which the optical subcarriers SC1 and SC2 were assigned), the satellite B can discard or ignore the data.

Figure 8A:
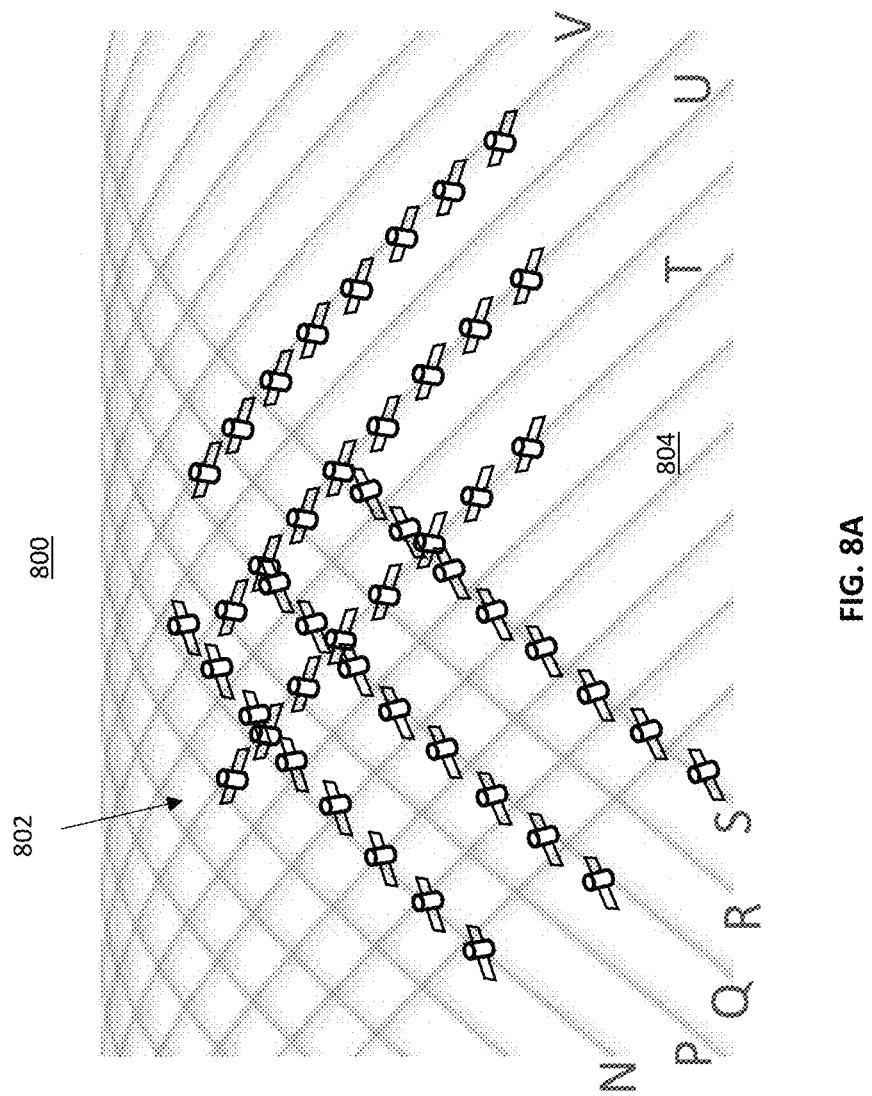
FIG. 8A is a diagram of an additional example constellation of satellites.

FIG. 8 shows an orbital map for a constellation 800 of satellites 802 orbiting an astronomical body 804 (e.g., Earth). Each of the satellites 802 orbits the astronomical body 106 according to a respective orbit (e.g., one of orbits N, P, Q, R, S, T, U, and V). Each of the orbits is elliptical or circular about the astronomical body 106 in three-dimensions. However, for ease of illustration, the orbital map is shown as a two dimensional projection (e.g., a two dimensional Mercator map). In some implementations, at least some of the orbits can overlap with one another and/or lie on overlapping orbital planes. For example, at least some of the orbits can have different inclinations respect to the astronomical body 106.

As shown in FIG. 8, multiple satellites 802 can traverse a particular orbit in a sequence or "train." For instance, in this example, the constellation 800 includes six different sequences or trains of satellites traversing orbits N, Q, S, T, U, and V, respectively. Each sequence or train includes eight respective satellites.

As described above, each of the satellites in a constellation can exchange data with one or more other satellites to form a mesh network. In some implementations, the mesh network can be implemented by instructing each satellite to establish a communications link with one or more specific other satellites based on the orbit of each of the satellites and/or a relative position of each of the satellites within the constellation.

Figure 9A:
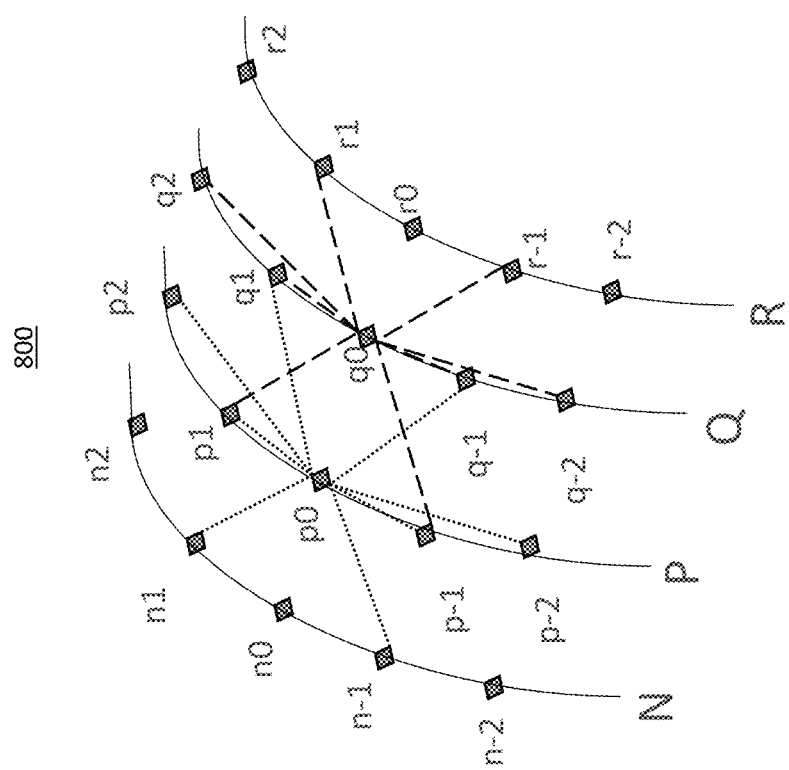
FIGS. 9A and 9B are diagrams of example selection patterns for establishing connection links between satellites.

For example, as shown in FIG. 9A, the constellation 800 can include a first sequence or train satellites traversing an orbit N (e.g., satellites . . . n−2, n−1, n0, n1, and n2 . . . sequentially), a second sequence or train satellites traversing an orbit P (e.g., satellites . . . p−2, p−1, p0, p1, and p2 . . . sequentially), a third sequence or train satellites traversing an orbit Q (e.g., satellites . . . q−2, q−1, q0, q1, and q2 . . . sequentially), and a fourth sequence or train satellites traversing an orbit R (e.g., satellites . . . r−2, r−1, r0, r1, and r2 . . . sequentially).

In the illustrated configuration, the constellation 800 forms a grid-like pattern around at least a portion of the astronomical body as they orbit the astronomical body. For example, the satellites n0, p0, q0, and r0 are "parallel" to one another with respect to the astronomical body (e.g., each of these satellites occupies the same angular position along their respective orbits). Similarly, the satellites n1, p1, q1, and r1 are parallel to one another with respect to the astronomical body. Similarly, the satellites n−1, p−1, q−1, and r−1 are parallel to one another with respect to the astronomical body, and so forth.

Each satellite can establish a communications link with other satellites based on a selection pattern. In some implementations, the selection pattern can be determined by the terrestrial control system 150 (e.g., as shown in FIG. 1A), and the terrestrial control system 150 can transmit instructions or commands to each of the satellites in a constellation to establish connection links in accordance with the selection pattern. In some implementations, the communications links can be established using the techniques described herein (e.g., as described with reference to FIGS. 1-7B).

In one example pattern, a first satellite can establish a communications link with other satellites in the constellation that are both (i) in the same orbit as the first satellite, and (ii) within two positions away from the first satellite in the same sequence. Further, the first satellite can establish a communications link with other satellites in the constellation that are both (i) in an orbit that is directly adjacent to the orbit of the first satellite with respect to the constellation, and (ii) one position away from a reference satellite in that directly adjacent orbit, where the reference satellite is the satellite in the directly adjacent orbit that is nearest to the first satellite (e.g., occupies the same angular position as the first satellite along their respective orbits).

For example, the satellite p0 is in the orbit P, and can establish communications links with the satellites p−2, p−1, p1, and p2 (the satellites that are in the same orbit P, as well as within two positions away from the satellite p0 in the same sequence). Further, the satellite p0 can establish communications links with the satellites n−1 and n1 (the satellites that are in the orbit N that is directly adjacent to the orbit P, as well as one position away from a reference satellite n0 nearest to the satellite p0 in that orbit). Further, the satellite p0 can establish communications links with the satellites q−1 and q1 (the satellites that are in the orbit Q that is also directly adjacent to the orbit P, as well as one position away from a reference satellite q0 nearest the satellite q0 in that orbit).

As another example, the satellite q0 is in the orbit Q, and can establish communications links with the satellites q−2, q−1, q1, and q2 (the satellites that are in the same orbit Q, as well as within two positions away from the satellite q0 in the same sequence). Further, the satellite q0 can establish communications links with the satellites p−1 and p1 (the satellites that are in the orbit P that is directly adjacent to the orbit Q, as well as one position away from a reference satellite p0 nearest to the satellite q0 in that orbit). Further, the satellite p0 can establish communications links with the satellites r−1 and r1 (the satellites that are in the orbit R that is also directly adjacent to the orbit Q, as well as one position away from a reference satellite r0 nearest to the satellite q0 in that orbit).

Similarly, each of the other satellites of the constellation 800 can establish connections with other satellites in accordance with this selection pattern.

In some implementations, the satellites in the constellation can establish connections with other satellites in accordance with the technique described with respect to FIG. 6. As an example, referring to FIG. 9A, each of the satellites of the constellation 800 can include a respective high speed transmitter and multiple low speed transmitters. The high speed transmitter can be used to communicate with multiple other satellites concurrently (e.g., according to a multi-cast or shared cast technique, as described above). Each of the low speed transmitters can be used to communicate with one another satellite. For instance, in FIG. 9A, the satellite p0 can communicate with the satellites n1, p1, p2, and q1 using its high speed transceiver. Further, the satellite p0 can communicate with each of the satellites n−1, p−1, p−2, and q−1 using a different respective low speed transceiver.

In another example pattern, a first satellite can establish a communications link with other satellites in the constellation that are both (i) in the same orbit as the first satellite, and (ii) within two positions away from the first satellite in the same sequence. Further, the first satellite can establish a communications link with other satellites in the constellation that are both (i) in an orbit that is directly adjacent to the orbit of the first satellite with respect to the constellation, and (ii) two positions away from a reference satellite in that directly adjacent orbit, where the reference satellite is the satellite in the directly adjacent orbit that is nearest to the first satellite (e.g., occupies the same angular position as the first satellite along their respective orbits).

Figure 9B:
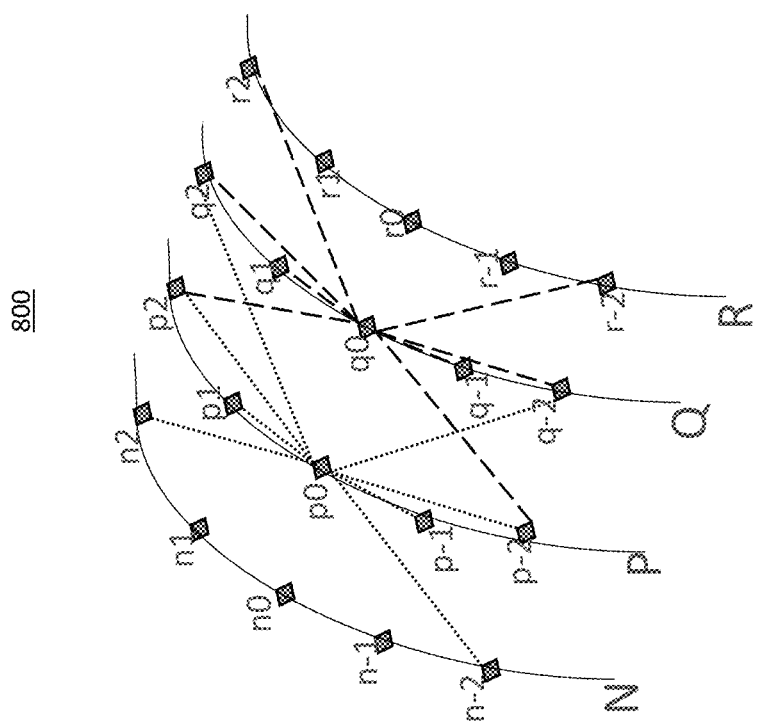

For example, as shown in FIG. 9B, the satellite p0 is in the orbit P, and can establish communications links with the satellites p−2, p−1, p1, and p2 (the satellites that are in the same orbit P, as well as within two positions away from the satellite p0 in the same sequence). Further, the satellite p0 can establish communications links with the satellites n−2 and n2 (the satellites that are in the orbit N that is directly adjacent to the orbit P, as well as two positions away from a reference satellite n0 nearest to the satellite p0 in that orbit). Further, the satellite p0 can establish communications links with the satellites q−2 and q2 (the satellites that are in the orbit Q that is also directly adjacent to the orbit P, as well as two positions away from a reference satellite q0 nearest the satellite q0 in that orbit).

As another example, the satellite q0 is in the orbit Q, and can establish communications links with the satellites q−2, q−1, q1, and q2 (the satellites that are in the same orbit Q, as well as within two positions away from the satellite q0 in the same sequence). Further, the satellite q0 can establish communications links with the satellites p−2 and p2 (the satellites that are in the orbit P that is directly adjacent to the orbit Q, as well as two positions away from a reference satellite p0 nearest to the satellite q0 in that orbit). Further, the satellite p0 can establish communications links with the satellites r−2 and r2 (the satellites that are in the orbit R that is also directly adjacent to the orbit Q, as well as two positions away from a reference satellite r0 nearest to the satellite q0 in that orbit).

Similarly, each of the other satellites of the constellation 800 can establish connections with other satellites in accordance with this selection pattern.

In some implementations, the satellites in the constellation can establish connections with other satellites in accordance with the technique described with respect to FIG. 6. As an example, referring to FIG. 9B, each of the satellites of the constellation 800 can include a respective high speed transmitter and multiple low speed transmitters. The high speed transmitter can be used to communicate with multiple other satellites concurrently (e.g., according to a multi-cast or shared cast technique, as described above). Each of the low speed transmitters can be used to communicate with one another satellite. For instance, in FIG. 9B, the satellite p0 can communicate with the satellites n2, p1, p2, and q2 using its high speed transceiver. Further, the satellite p0 can communicate with each of the satellites n−2, p−1, p−2, and q−2 using a different respective low speed transceiver.

Figure 10:
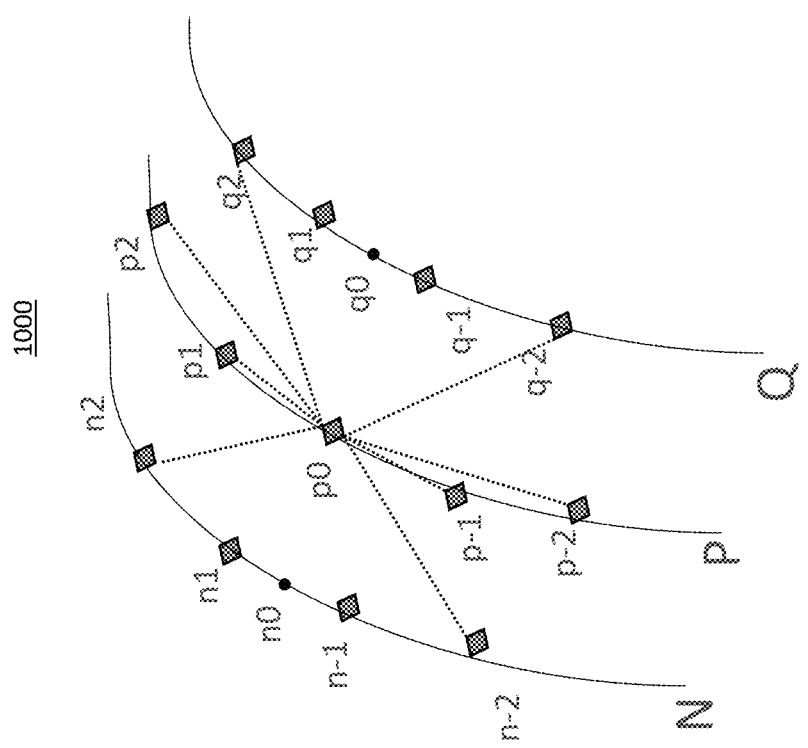
FIG. 10 is a diagram of an example selection pattern for establishing connection links between satellites.

FIG. 10 shows another example constellation 1000 of satellites. In this example, the constellation 1000 includes a first sequence or train satellites traversing an orbit N (e.g., satellites . . . n−2, n−1, n1, and n2 . . . sequentially), a second sequence or train satellites traversing an orbit P (e.g., satellites . . . p−2, p−1, p0, p1, and p2 . . . sequentially), and a third sequence or train satellites traversing an orbit Q (e.g., satellites . . . q−2, q−1, q1, and q2 . . . sequentially).

In this configuration, the satellites in directly adjacent orbits are not "parallel" with one another. Instead, the angular position of each satellite along its orbit is halfway between the angular positions of the two nearest satellites along a directly adjacent orbit. For example, the angular position of the satellite q1 along the orbit Q is halfway between the angular positions of the satellites p0 and p1 along the orbit P. As another example, the angular position of the satellite n−1 along the orbit N is halfway between the angular positions of the satellites p0 and p−1 along the orbit P.

Each satellite can establish a communications link with other satellites based on a selection pattern. In some implementations, the selection pattern can be determined by the terrestrial control system 150 (e.g., as shown in FIG. 1A), and the terrestrial control system 150 can transmit instructions or commands to each of the satellites in a constellation to establish connection links in accordance with the selection pattern. In some implementations, the communications links can be established using the techniques described herein (e.g., as described with reference to FIGS. 1-7B).

In one example pattern, a first satellite can establish a communications link with other satellites in the constellation that are both (i) in the same orbit as the first satellite, and (ii) within two positions away from the first satellite in the same sequence. Further, the first satellite can establish a communications link with other satellites in the constellation that are both (i) in an orbit that is directly adjacent to the orbit of the first satellite with respect to the constellation, and (ii) two positions away from a reference point in that directly adjacent orbit, where the reference point is the point in the directly adjacent orbit that is nearest to the first satellite (e.g., occupies the same angular position as the first satellite along their respective orbits).

For example, as shown in FIG. 10, the satellite p0 is in the orbit P, and can establish communications links with the satellites p−2, p−1, p1, and p2 (the satellites that are in the same orbit P, as well as within two positions away from the satellite p0 in the same sequence). Further, the satellite p0 can establish communications links with the satellites n−2 and n2 (the satellites that are in the orbit N that is directly adjacent to the orbit P, as well as two positions away from a reference point n0 nearest to the satellite p0 in that orbit). Further, the satellite p0 can establish communications links with the satellites q−2 and q2 (the satellites that are in the orbit Q that is also directly adjacent to the orbit P, as well as two positions away from a reference point q0 nearest the satellite q0 in that orbit).

Similarly, each of the other satellites of the constellation 1000 can establish connections with other satellites in accordance with this selection pattern.

In some implementations, the satellites in the constellation can establish connections with other satellites in accordance with the technique described with respect to FIG. 6. As an example, referring to FIG. 10, each of the satellites of the constellation 1000 can include a respective high speed transmitter and multiple low speed transmitters. The high speed transmitter can be used to communicate with multiple other satellites concurrently (e.g., according to a multi-cast or shared cast technique, as described above). Each of the low speed transmitters can be used to communicate with one another satellite. For instance, in FIG. 10, the satellite p0 can communicate with the satellites n2, p1, p2, and q2 using its high speed transceiver. Further, the satellite p0 can communicate with each of the satellites n−2, p−1, p−2, and q−2 using a different respective low speed transceiver.

As described above (e.g., with reference to FIG. 1B), at least some of the satellites in a constellation of satellites can be in one or more orbits around an astronomical body. Each of the orbits can be a path (e.g., an elliptical or circular path) along an orbital plane. Further, at least some of the orbits and/or orbital planes can intersect one another. For example, each of the orbits can have a different orbital inclination with respect to the astronomical body, and each of the orbits can pass over two common points on opposing sides of the astronomical body.

Further, in some implementations, the satellites can be controlled such that the distance between satellites in a particular orbit do not change over time. For example, satellites that are adjacent to one another in a particular orbit can maintain a particular fixed distance from each other as they orbit the astronomical body.

However, the distance between satellites in one orbit and satellites in another orbit may change over the course of their orbits. For example, due to differences in the inclinations of their orbits, satellites in one orbit may be drawn nearer to satellites in the other orbit as they travel towards the points of intersection of their orbits and/or orbital planes. As another example, satellites in one orbit may be drawn further from satellites in the other orbit as they travel away from the points of intersection of their orbits and/or orbital planes.

Due to these changes in distances, transmissions from one satellite to another may be subject to Doppler shift. For example, when two satellites are draw nearer to one another, the transmission from one satellite to another may experience a frequency shift (e.g., an increase in frequency). As another example, when two satellites are draw further from one another, the transmission from one satellite to another may also experience a frequency shift (e.g., a decrease in frequency). To account for this possibility, a guard band (e.g., a 1 GHz to 1.5 GHz frequency band) can be inserted between the optical subcarriers to accommodate shifts in frequency.

Further, the satellites can synchronize their clocks and lasers with one another, such that they can accurately account for Doppler shift. For example, each satellite can track the distance between itself and one or more neighboring satellites in a constellation. As the distance between two satellites increases, the satellites can account for the Doppler shift by processing optical signals transmitted between them according to lower frequencies than would otherwise be used if the distance between the satellites were not changing. Further, as the distance between two satellites decreases, the satellites can account for the Doppler shift by processing optical signals transmitted between them according to higher frequencies than would otherwise be used if the distance between the satellites were not changing. Further, each of the satellites can include one or more chromatic dispersion equalizers (CDEQs) to compensate for differences in chromatic dispersion resulting from the Doppler shift (e.g., differences in the arrival time of different components of an optical signal based on the wavelengths of those components). Further, each of the satellites can include one or more clock timing recovery circuits for extracting data from the data streams according to different arrival times, one or more forward error correction (FEC) circuits for controlling the error in the data streams, and/or one or more buffers for temporarily storing packets of a data stream as they await further processing.

Figure 11A:
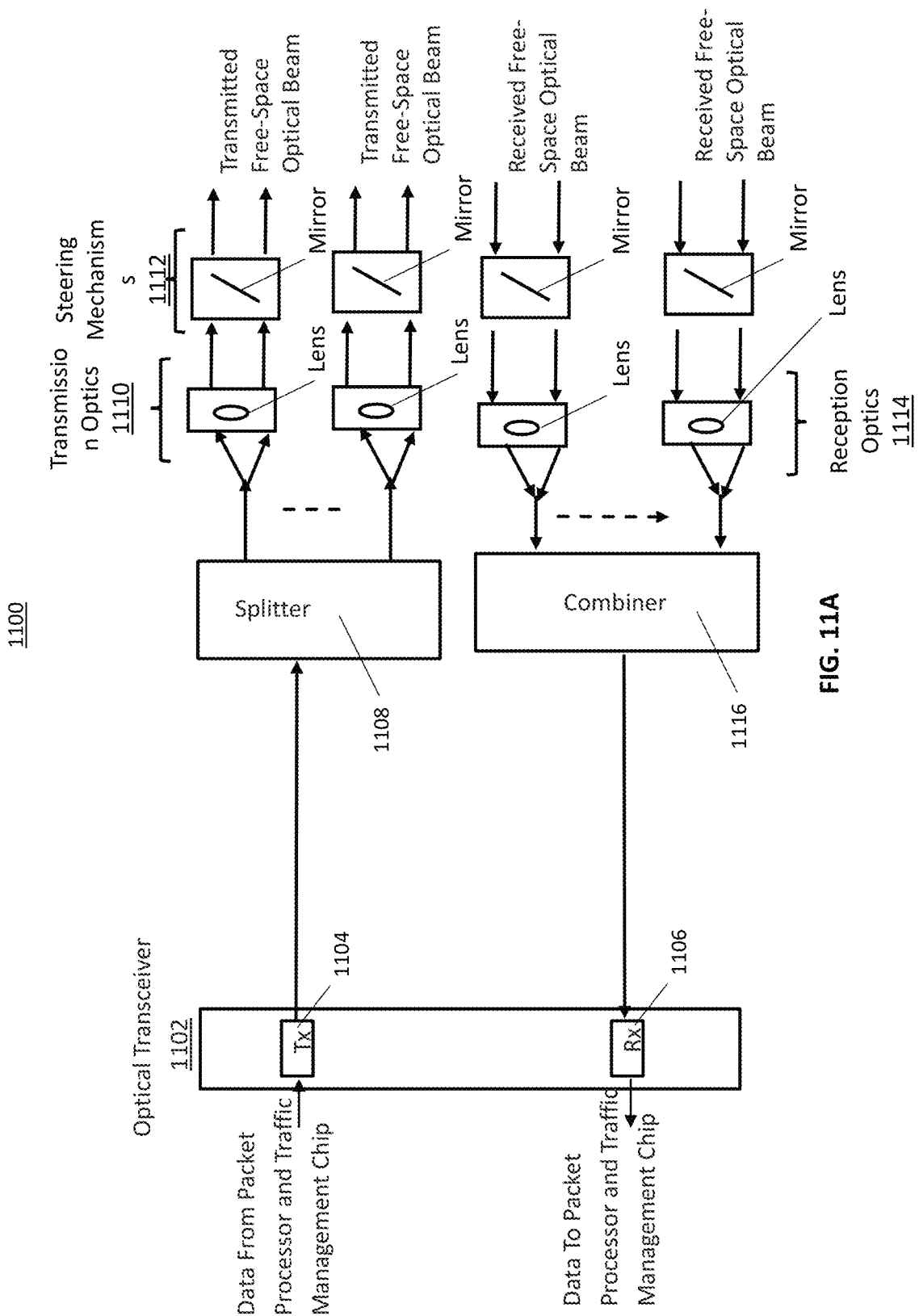
FIG. 11A is a diagram of an example satellite communications module.

FIG. 11A shows example satellite communications module 1100. In some implementations, the satellite communications module can be included in one or more of the satellites described herein (e.g., with reference to FIGS. 1-10).

The satellite communications module 1100 includes an optical transceiver 1102. In some implementations, the optical transceiver 1102 can be similar to one or more of the optical transceivers described herein (e.g., with reference to FIGS. 1-7B). The optical transceiver 1102 includes an optical transmitter 1104 for transmitting optical signals to one or more satellites, and an optical receiver 1106 for receive optical signal from one or more satellites.

As described above, a satellite can modulate an optical signal such that it includes information indicative of data intended for one or more other satellites, and transmit the same (or substantially similar) optical signal to each of those satellites. For example, referring to FIG. 11A, the transmitter 1104 can receive data to be transmitted to one or more other satellites (e.g., via a packet processor and traffic management chip), and modulate an optical signal based on the data according to one or more optical subcarriers. The operation of the transmitter 1104 is described in further detail below. Further, the transmitter 1104 can provide the modulated optical signal to an optical splitter 1108, which splits the modulated optical signal into one or more portions (e.g., power-divided portions). In some implementations, the optical splitter 1108 can split the modulated optical signal into two, three, four, or more portions.

Each of the portions of the modulated optical signal are provided to a respective set of transmission optics 1110. Each of the sets of transmission optics 1110 can include one or more lens (e.g., culminating and/or focusing lenses), mirrors, and/or other optical components that focus, modify, and/or direct light such that is suitable for transmission from the satellite to another satellite.

Further, light from each of the sets of transmission optics 1110 is provided to a respective steering mechanism 1112. Each steering mechanism 1112 includes one adjustable mechanism for directing the received light in the direction of a particular satellite as a free-space optical beam. For example, each of the steering mechanisms 1112 can include one or more articulating mirrors for reflecting the received light towards a particular satellite, one or more motors for controlling the position and orientation of the mirrors, and an electronic control system for controlling the motors.

As described above, a satellite can also receive optical signals from one or more other satellites, and demodulate the optical signals to obtain receiver data carried by the optical signals. For example, referring to FIG. 11A, the steering mechanisms 1112 can direct incoming free-space optical beams to respective sets of reception optics 1114. Each of the sets of reception optics 1114 can include one or more lens (e.g., culminating and/or focusing lenses), mirrors, and/or other optical components that focus, modify, and/or direct light such that is suitable for interpretation by the transceiver 1102.

Further, the light is provided to an optical combiner 1116, which combines the light into a signal optical signal. In some implementations, the optical combiner 1116 can combine light received from two, three, four or more satellites into a single optical signal.

The optical signal is provided to the receiver 1106. The receiver demodulates the optical signal according to one or more optical subcarriers, and receivers the data carried by the optical signal. The data is provided to a data to packet processor and traffic management chip for further processing and/or interpretation. The operation of the receiver 1106 is described in further detail below.

Figure 11B:
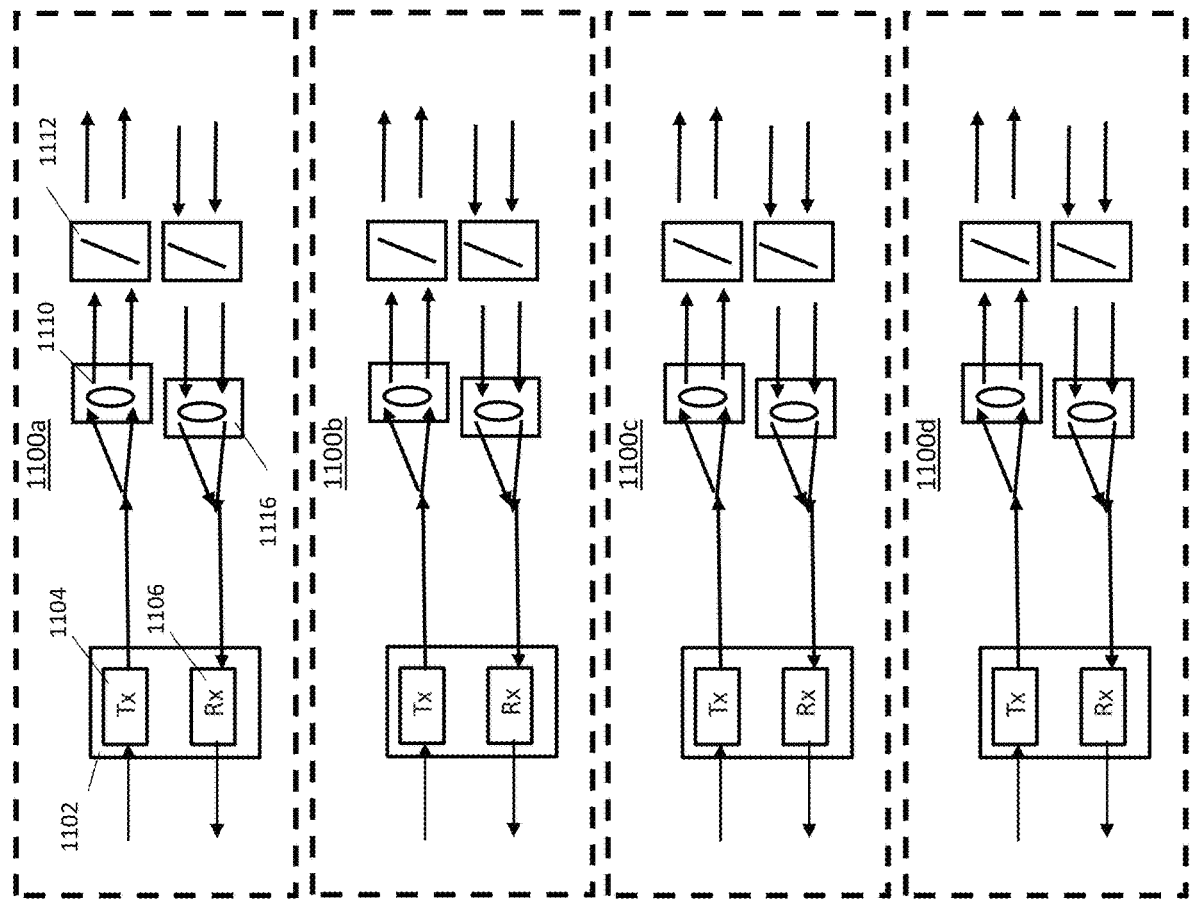
FIG. 11B is a diagram of an example arrangement of multiple satellite communications modules.

In some implementations, a satellite can include multiple satellite communications modules 1100 to communicate with several other satellites concurrently. As an example, FIG. 11B shows a configuration having four satellite communications modules 1100a-1100d. In general, each of the satellite communications modules 1100a-1100d can be similar to the satellite communications module 1100 shown in FIG. 11A. However, in this example, each of the satellite communications modules 1100a-1100d is configured to transmit an optical beam to a single other satellite, and receive an optical beam from a single other satellite (e.g., no optical splitter 1108 or optical combiner 1116 is included).

In some implementations, a satellite communications module can include multiple optical transceivers for transmitting data to and receiving data from other satellite communications modules, and multiple RF transceivers for transmitting data to and receiving data from terrestrial nodes. Further, the satellite communications module can include one or more chips or circuitry to control the operation of the transceivers.

Figure 12:
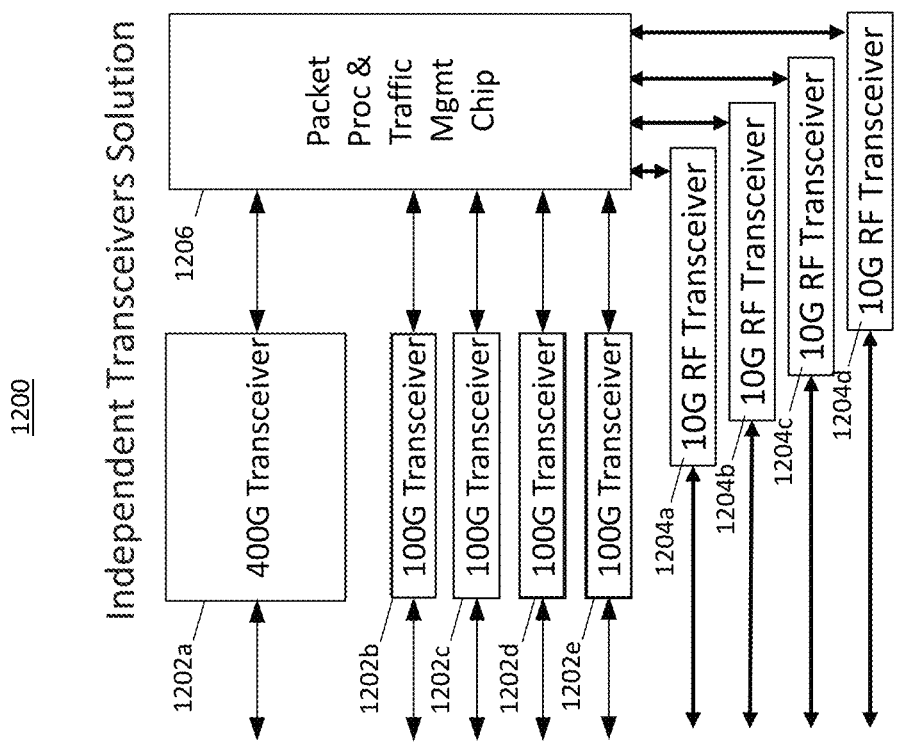
FIG. 12 is a diagram of an example satellite communications module.

As an example, FIG. 12 shows a satellite communications module 1200. The satellite communications module 1200 includes multiple optical transceivers 1202a-1202e for communicating with other satellite communications modules via free-space optical communication. In this example, the optical transceiver 1202a has greater capabilities than those of the optical transceivers 1202b-1202e. For instance, the optical transceiver 1202a can transmit and/or receive data according to a bandwidth of 40 GBit/s, whereas each of the optical transceivers 1202b-1202e can transmit and/or receive data according to a bandwidth of 10 GBit/s. As described above, in some implementations, the optical transceiver 1202a having the greater capabilities can be used to communicate with multiple other satellite communications modules (e.g., according to a multi-cast or shared cast technique, as described above), whereas each of the optical transceivers 1202b-1202e having the lesser capabilities can be used to communicate with a single respective other satellite communications module (e.g., according to a dedicated communications link, as described above).

Further, the satellite communications module 1200 includes multiple RF transceivers 1204a-1204d for communicating with one or more terrestrial nodes. In some implementations, each of the RF transceivers 1204a-1204d can be used to communicate with a single respective terrestrial node. In some implementations, multiple ones of the RF transceivers 1204a-1204d can be used to communicate with the same terrestrial node.

Further, the satellite communications module 1200 includes a packet processor and traffic management chip 1206. The chip 1206 can be implemented using one or more processors or special purpose logic circuitry, such as an FPGA (field programmable gate array) and/or an ASIC (application specific integrated circuit).

The chip 1206 controls the flow of data into the optical transceivers 1202a-1202e and the RF transceivers 1204a-1204d. For example, the chip 1206 can receive data to be transmitted to one or more other satellite communications modules, segment the data into different portions (e.g., based on their intended destinations), and route the portions of data to the appropriate optical transceivers 1202a-1202e for transmission. As another example, the chip 1206 can receive data to be transmitted to one or more terrestrial nodes, segment the data into different portions (e.g., based on their intended destinations), and route the portions of data to the appropriate RF transceivers 1204a-1204d for transmission.

The chip 1206 also processes the data received from the optical transceivers 1202a-1202e and the RF transceivers 1204a-1204d. For example, the chip 1206 can receive data from the optical transceivers 1202a-1202e and/or the RF transceivers 1204a-1204d, and route the data to their intended destinations (e.g., other satellite communications modules and/or terrestrial nodes).

In the example shown in FIG. 11, the satellite communications module includes several individual transceivers communicatively coupled to a chip. However, this need not always be the case. For instance, in some implementations, a satellite communications module can include a single integrated chip and/or circuitry that is configured to control optical components for communicating with other satellite communications module (e.g., one or more transmitter and receiver optical sub-assemblies (TROSAs)) and/or RF components for communicating with terrestrial nodes (e.g., one or more RF radios)

Figure 13:
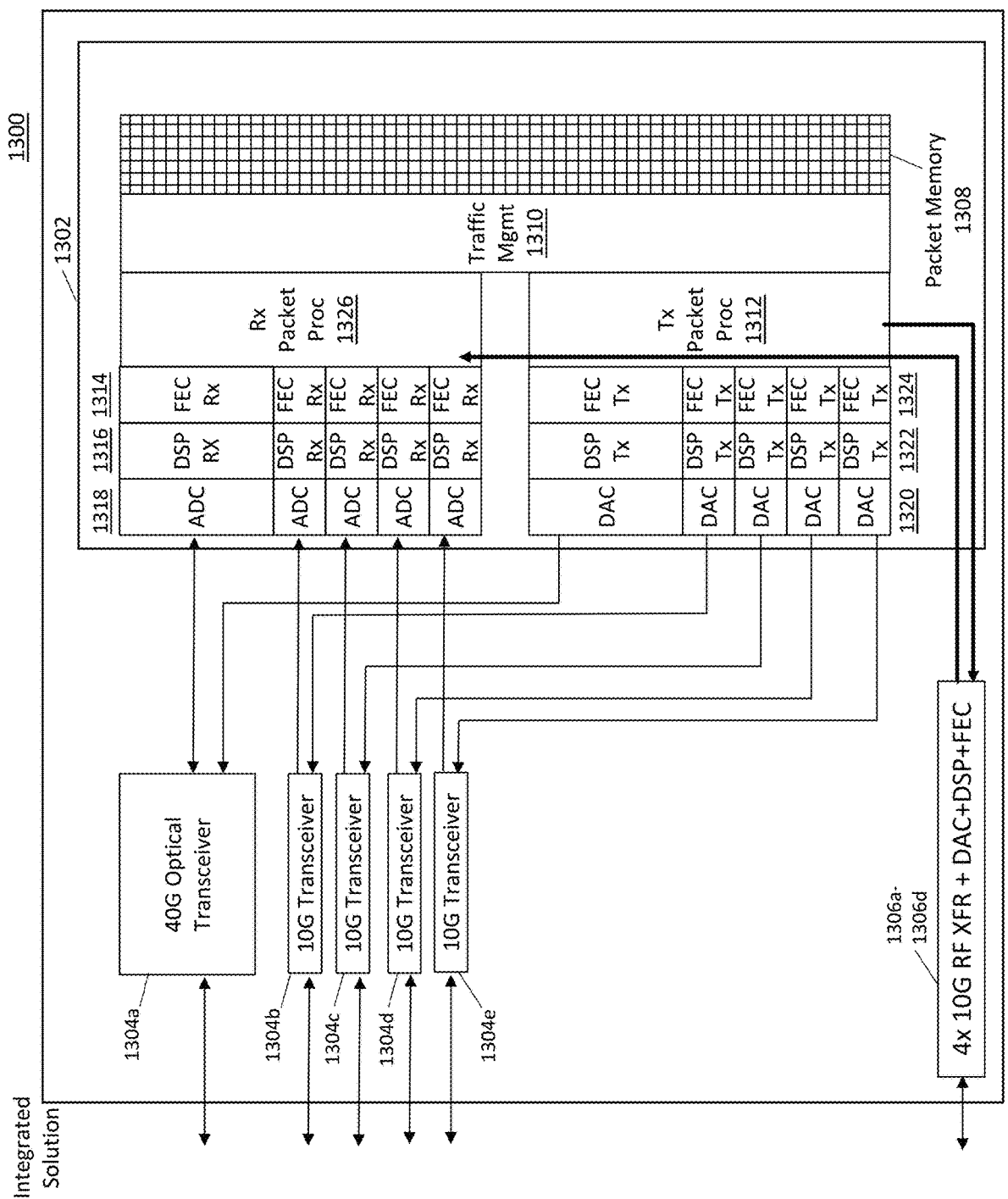
FIG. 13 is a diagram of another example satellite communications module.

As an example, FIG. 13 shows a satellite communications module 1300 having an integrated chip or circuitry 1302 and several TROSAs 1304a-1304e. Each of the TROSAs 1304a-

1304e includes optical components for transmitting and/or receiving optical signals from other satellite communications modules. As an example, each of the TROSAs 1304a-1304e can include one or more lasers, optical hybrids, lenses, mirrors, optical splitters, optical combiners, analog to digital converters, digital to analog converts, optical amplifiers, and/or other optical components for processing optical signals. Example optical components are described in greater detail below (e.g., in connection with FIGS. 15 and 17A).

In this example, the TROSA 1304a has greater capabilities than those of the TROSAs 1304b-1304e. For instance, the TROSA 1304a can transmit and/or receive data according to a bandwidth of 40 GBit/s, whereas each of the TROSAs 1304b-1304e can transmit and/or receive data according to a bandwidth of 10 GBit/s. In some implementations, the TROSA 1304a having the greater capabilities can be used to communicate with multiple other satellite communications modules (e.g., according to a multi-cast or shared cast technique, as described above), whereas each of the TROSAs 1304b-1304e having the lesser capabilities can be used to communicate with a single respective other satellite communications module (e.g., according to a dedicated communications link, as described above).

Further, the satellite communications module 1200 includes multiple RF radios 1306a-1306d for communicating with one or more terrestrial nodes. In some implementations, each of the RF radios 1306a-1306d can be used to communicate with a single respective terrestrial node. In some implementations, multiple ones of the RF radios 1306a-1306d can be used to communicate with the same terrestrial node.

The operations of the TROSAs 1304a-1304e and the RF radios 1306a-1306d are controlled by the integrated chip or circuitry 1302. In some implementations, the integrated chip or circuitry 1302 can be implemented using one or more processors or special purpose logic circuitry, such as an FPGA (field programmable gate array) and/or an ASIC (application specific integrated circuit).

The integrated chip or circuitry 1302 can use the TROSAs 1304a-1304e to transmit data to one or more other satellite communications modules. For example, the integrated chip or circuitry 1302 can receive data to be transmitted to one or more other satellite communications modules, and buffer the data in a packet memory 1308. Further, the integrated chip or circuitry 1302 can include a traffic management module 1310 to segment the data into different portions (e.g., based on their intended destinations), and instruct a Tx packet processor 1312 to route the portions of data to their intended destinations using one or more of the TROSAs 1304a-1304e. The Tx packet processor 1312 provides each of the portions of data to a respective set of forward error correction (FEC) modules 1314, Tx digital signal processors (DSP) 1316, and digital to analog converters 1318, which outputs one or more analog control signals for generating and modulating an optical signal using a respective one of the TROSAs 1304a-1304e (e.g., to generate optical beams carrying the data to one or more other satellite communications modules).

Similarly, the integrated chip or circuitry 1302 can receive data to be transmitted to one or more terrestrial nodes, and buffer the data in the packet memory 1308. Further, the integrated chip or circuitry 1302 can include a traffic management module 1310 to segment the data into different portions (e.g., based on their intended destinations), and instruct the Tx packet processor 1312 to route the portions of data to their intended destinations using one or more of the RF radios 1306a-1306e. The Tx packet processor 1312 provides each of the portions of data to a respective set of forward error correction (FEC) modules 1314, Tx digital signal processors (DSP) 1316, and digital to analog converters 1318, which outputs one or more analog control signals for generating RF signals using a respective one of the RF radios 1306a-1306d (e.g., to generate RF signals the data to one or more terrestrial nodes).

The integrated chip or circuitry 1302 can also use the TROSAs 1304a-1304e to receive data from one or more other satellite communications modules. For example, the integrated chip or circuitry 1302 can receive analog optical signals from one or more of the TROSAs 1304a-1304e. Further, the integrated chip or circuitry 1302 can provide each of the optical signals to respective set of analog to digital converters 1320, Rx DSPs 1322, and FEC modules 1324, which outputs the data carried by the optical signal. The data can be further processed by an Rx packet processor 1326, and provided to the traffic management module 1310 for routing to its destination. In some implementations, the traffic management module 1312 can buffer the data in the packet memory 1308, and select portions of the data for transmission using one or more of the TROSAs 1304a-1304e and/or RF radios 1306a-1306d (e.g., as described above).

Similarly, the integrated chip or circuitry 1302 can also use the RF radios 1306a-1306d to receive data from one or more terrestrial nodes. For example, the integrated chip or circuitry 1302 can receive RF signals from one or more of the RF radios 1306a-1306d. Further, the integrated chip or circuitry 1302 can provide each of the RF signals to respective set of analog to digital converters 1320, Rx DSPs 1322, and FEC modules 1324, which outputs the data carried by the RF signal. The data can be further processed by an Rx packet processor 1326, and provided to the traffic management module 1310 for routing to its destination. In some implementations, the traffic management module 1312 can buffer the data in the packet memory 1308, and select portions of the data for transmission using one or more of the TROSAs 1304a-1304e and/or RF radios 1306a-1306d (e.g., as described above). Example components for processing data are described in greater detail below (e.g., in connection with FIGS. 16A-16C and 18).

Figure 14:
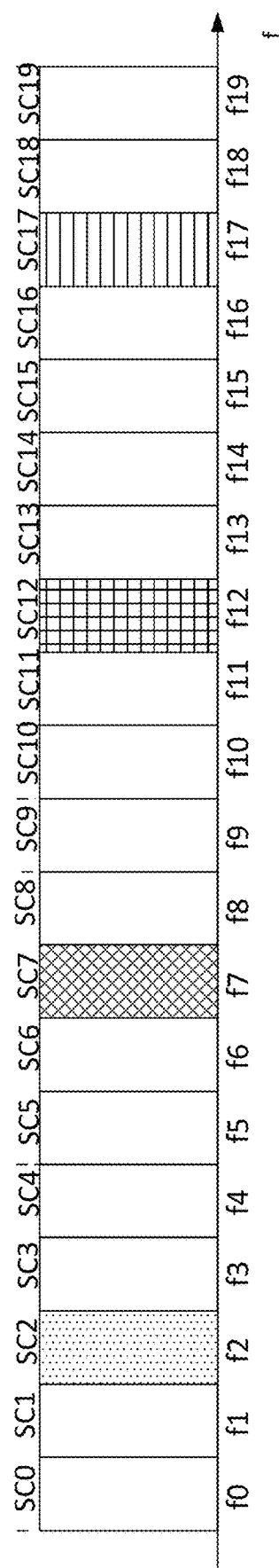
FIG. 14 is an example of a spectral plot showing optical subcarriers.

FIG. 14 illustrates an example of a transmission spectrum that can accommodate twenty optical subcarriers SC0 to SC19 that can be output from a transceiver or transmission module of a satellite. Each of the optical subcarriers SC0 to SC19 has a corresponding one of frequencies f0 to f19. In some implementations, the optical subcarriers SC0 to SC19 are Nyquist subcarriers. Nyquist subcarriers are a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier can have an optical spectral bandwidth that is at least equal to the Nyquist frequency, as determined by the baud rate of such subcarrier.

In some implementations, certain components of a transceiver or transmission module of a satellite (e.g., optical components and certain electrical components) can be configured such that they are capable of processing signals only over a limited frequency range or bandwidth. The limited frequency range or bandwidth can be less than the range of signal frequencies that can be accommodated by the optical and electrical components in other transceivers or transmission modules. For example, electrical components, such as digital-to-analog (DACs), analog-to-digital converters (ADCs), and digital signal processors (DSPs), and optical components, such as modulators, in some transceivers or transmission modules can have an associated bandwidth that is less than the corresponding components in other transceivers or transmission modules. This can be useful, for example, in reduce the cost of deploying and/or maintaining the network.

As shown in FIG. 14, certain option subcarriers, such as the optical subcarriers SC2, SC7, SC12, and SC17, can be designated or dedicated to carry information related to a parameter or characteristic associated with one or more of the transceivers or transmission modules. For example, such parameters can correspond to an amount of data, data rate, or capacity to be output by one or more transceivers or transmission modules. In particular, such optical subcarriers can carry information, for example, to configure or adjust the amount of data, capacity or data rate of data output from the transceivers or transmission modules. As another example, each of these optical subcarriers can carry user or customer data (also referred to as client data) in addition to control information. In the example shown in FIG. 14, only the optical subcarriers SC2, SC7, SC12, and S17 are transmitted.

As another example, the subcarriers SC2, SC7, SC12, and SC17 can be modulated to carry control or operations, administration, and maintenance (OAM) information and related data corresponding to parameters associated therewith, such as the capacity and status of the transceivers or transmission modules. As another example, the subcarrier SC2 can be modulated carry such control and parameter information associated with the first transceiver or transmission module, the subcarrier SC7 can modulated to carry such control and parameter information associated with the second transceiver or transmission module, the subcarrier SC12 can be modulated to carry such control and parameter information associated with the third transceiver or transmission module, and the subcarrier SC17 can be modulated to carry such control and parameter information associated with the fourth transceiver or transmission module. As another example, optical subcarriers can be modulated to carry information related to a parameter associated the timing and scheduling of data transmission from the first, second, third, and fourth transceivers or transmission modules to the fifth transceiver or transmission module.

Data allocation and subcarrier transmission are described next with reference to FIG. 15 and FIGS. 16A-16C.

Figure 15:
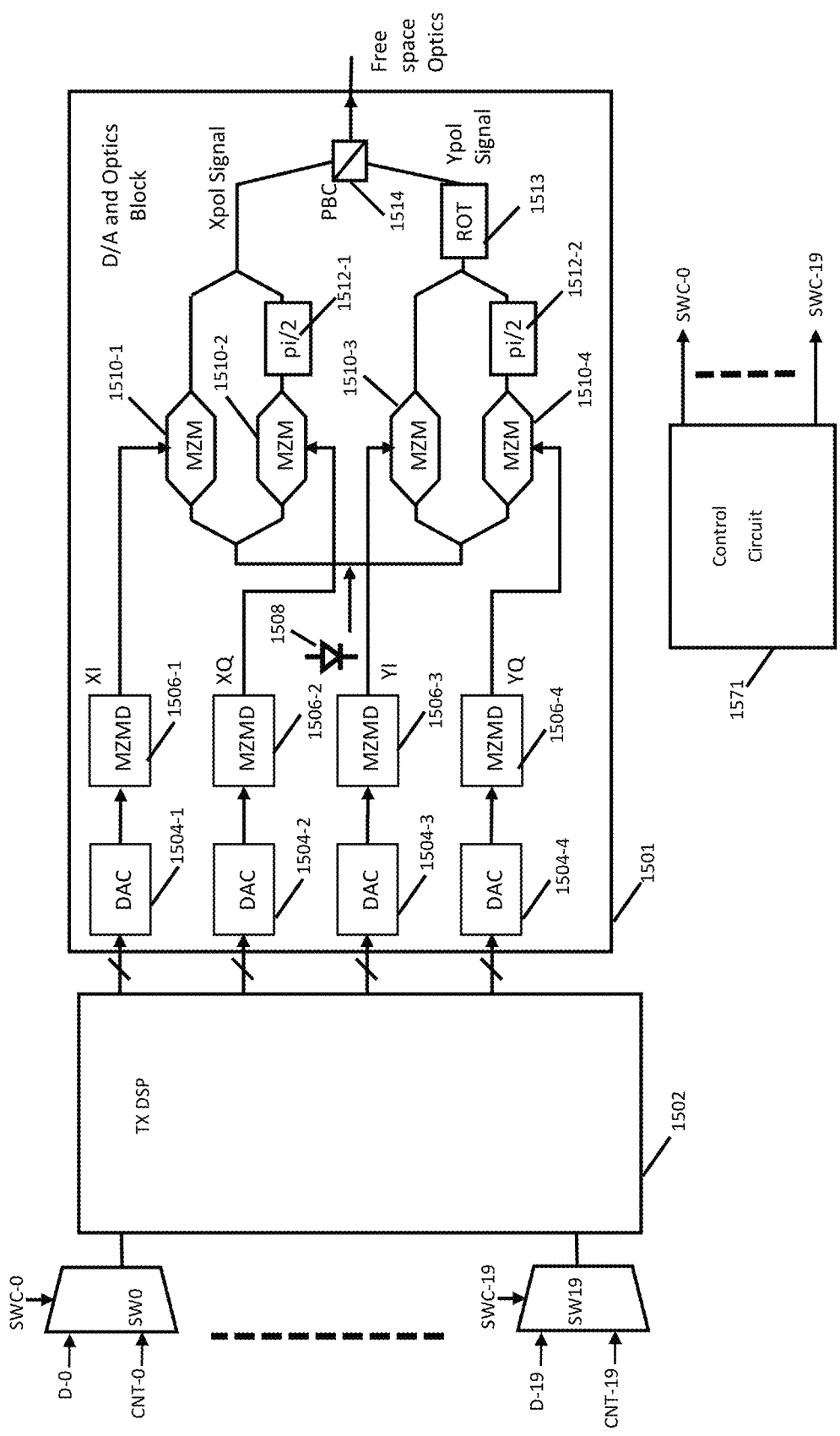
FIG. 15 shows example components of a transceiver used to transmit data.

FIG. 15 illustrates components of an optical transceiver for transmitting data (e.g., a transmitter or transmitter module) in greater detail. The transmitter includes a plurality of circuits or switches SW, as well as a transmitter DSP (TX DSP) 1502 and a D/A and optics block 1501. In this example, twenty switches (SW-0 to SW-19) are shown, although more or fewer switches can be provided than that shown in FIG. 15. In some implementations, each switch can have two respective inputs: the first input can receive user data, and the second input can receive control information or signals (CNT). Each of the switches SW-0 to SW-19 can receive a respective one of the control signals SWC-0 to SWC-19 output from the control circuit 1571 (which can include one or more microprocessors, field programmable gate arrays (FPGA), or other processor circuits). Based on the received control signal, each of the switches SW-0 to SW19 selectively outputs any one of the data streams D-0 to D-19, or a control signal CNT-0 to CNT-19. The control signals CNT can be any combination of configuration bits for control and/or monitoring purposes. For example, the control signals CNT can include instructions to one or more of the transceivers or transmission modules to change the data output from that transceiver or transmission module, such as by identifying the optical subcarriers associated with such data. As another example, the control signals can include a series of known bits used in the transceivers or transmission modules to "train" a receiver to detect and process such bits so that the receiver can further process subsequent bits. As another example, the control channel CNT can include information that may be used by the polarization mode dispersion (PMD) equalizer circuits 1825, discussed below, to correct for errors resulting from polarization rotations of the X and Y components of one or more of the optical subcarriers. In a further example, the control information CNT can used to restore or correct phase differences between a laser transmit-side laser 1508 and a local oscillator laser 1710 in each of the transceivers or transmission modules. Such detected phase differences may be referred to as cycle slips. In a further example, the control information CNT can be used to recover, synchronize, or correct timing differences between clocks provided in the transceivers or transmission modules.

In some implementations, one or more of the switches SW can be omitted, and the control signals CNT can be supplied directly to the DSP 1502. Moreover, each input to the DSP 1502, such as the inputs to FEC encoders 1602 described below (see FIG. 16A), can receive a combination of control information (e.g., as described above) as well as user data.

In some implementations, the control signal CNT can include information related to the number of optical subcarriers that are output from each of the transceivers or transmission modules. Such selective transmission of optical subcarriers is described with reference to FIGS. 16A-16C. Although such description is provided in connection with the DSP 1502, similar circuitry can be included in a DSP of another transceiver or transmission module to adjust or control the number of optical subcarriers output therefrom.

Based on the outputs of the switches SW-0 to SW-19, the DSP 1502 can supply a plurality of outputs to the D/A and optics block 1501 including digital-to-analog conversion (DAC) circuits 1504-1 to 1504-4, which convert digital signal received from the DSP 1502 into corresponding analog signals. The D/A and optics block 1501 also includes driver circuits 1506-1 to 1506-2 that receive the analog signals from the DACs 1504-1 to 1504-4 and adjust the voltages or other characteristics thereof to provide drive signals to a corresponding one of the modulators 1510-1 to 1510-4.

The D/A and optics block 1501 further includes modulators 1510-1 to 1510-4 (e.g., Mach-Zehnder modulators (MZM)) that modulates the phase and/or amplitude of the light output from the laser 1508. As further shown in FIG. 15, light output from the laser 1508, also included in the block 1501, is split such that a first portion of the light is supplied to a first MZM pairing, including the MZMs 1510-1 and 1510-2, and a second portion of the light is supplied to a second MZM pairing, including the MZMs 1510-3 and 1510-4. The first portion of the light is split further into third and fourth portions, such that the third portion is modulated by the MZM 1510-1 to provide an in-phase (I) component of an X (or TE) polarization component of a modulated optical signal, and the fourth portion is modulated by the MZM 1510-2 and fed to a phase shifter 1512-1 to shift the phase of such light by 90 degrees in order to provide a quadrature (Q) component of the X polarization component of the modulated optical signal. Similarly, the second portion of the light is further split into fifth and sixth portions, such that the fifth portion is modulated by the MZM 1510-3 to provide an I component of a Y (or TM) polarization component of the modulated optical signal, and the sixth portion is modulated by the MZM 1510-4 and fed to a phase shifter 1512-2 to shift the phase of such light by 90 degrees to provide a Q component of the Y polarization component of the modulated optical signal.

The optical outputs of the MZMs 1510-1 and 1510-2 are combined to provide an X polarized optical signal including I and Q components and are fed to a polarization beam combiner (PBC) 1514 provided in block 1501. In addition, the outputs of the MZMs 1510-3 and 1510-4 are combined to provide an optical signal that is fed to polarization rotator 1513, further provided in block 1501 that rotates the polarization of such optical signal to provide a modulated optical signal having a Y (or TM) polarization. The Y polarized modulated optical signal also is provided to the PBC 1514, which combines the X and Y polarized modulated optical signals to provide a polarization multiplexed ("dual-pol") modulated optical signal onto free space (e.g., towards another satellite).

The polarization multiplexed optical signal output from the D/A and optics block 1501 includes the optical subcarriers SC0-SC19 noted above, such that each optical subcarrier has X and Y polarization components and I and Q components. Moreover, each of the optical subcarriers SC0 to SC19 can be associated with or correspond to a respective one of the outputs of the switches SW-0 to SW-19. In some implementations, the switches SW2, SW7, SW12, and SW17 can supply control information carried by a respective one of the control signals CNT-2, CNT-7, CNT-12, and CNT-17 to DSP 502. Based on such control signals, the DSP 1502 can provide outputs that result in the optical subcarriers SC2, SC7, SC12, and SC17 carrying data indicative of the control information carried by the CNT-2, CNT-7, CNT-12, and CNT-17, respectively. In addition, the remaining optical subcarriers SC0, SC1, SC3 to SC6, SC8 to SC11, SC13 to SC16, and SC18 to SC20 can carry information indicative of a respective one of the data streams D-0, D-1, D-3-D-6, D-8 to D-11, D-13 to D-16, and D-18 to D-20 output from a corresponding one of the switches SW0, SW1, SW3 to SW-6, SW-8 to SW11, SW13 to SW16, and SW18 to SW20. In some implementations, at least some of the switches (e.g., SW0 to SW19, as shown in FIG. 15) can be omitted, such that data stream are supplied directly to the Tx DSP 1502.

Figure 16A:
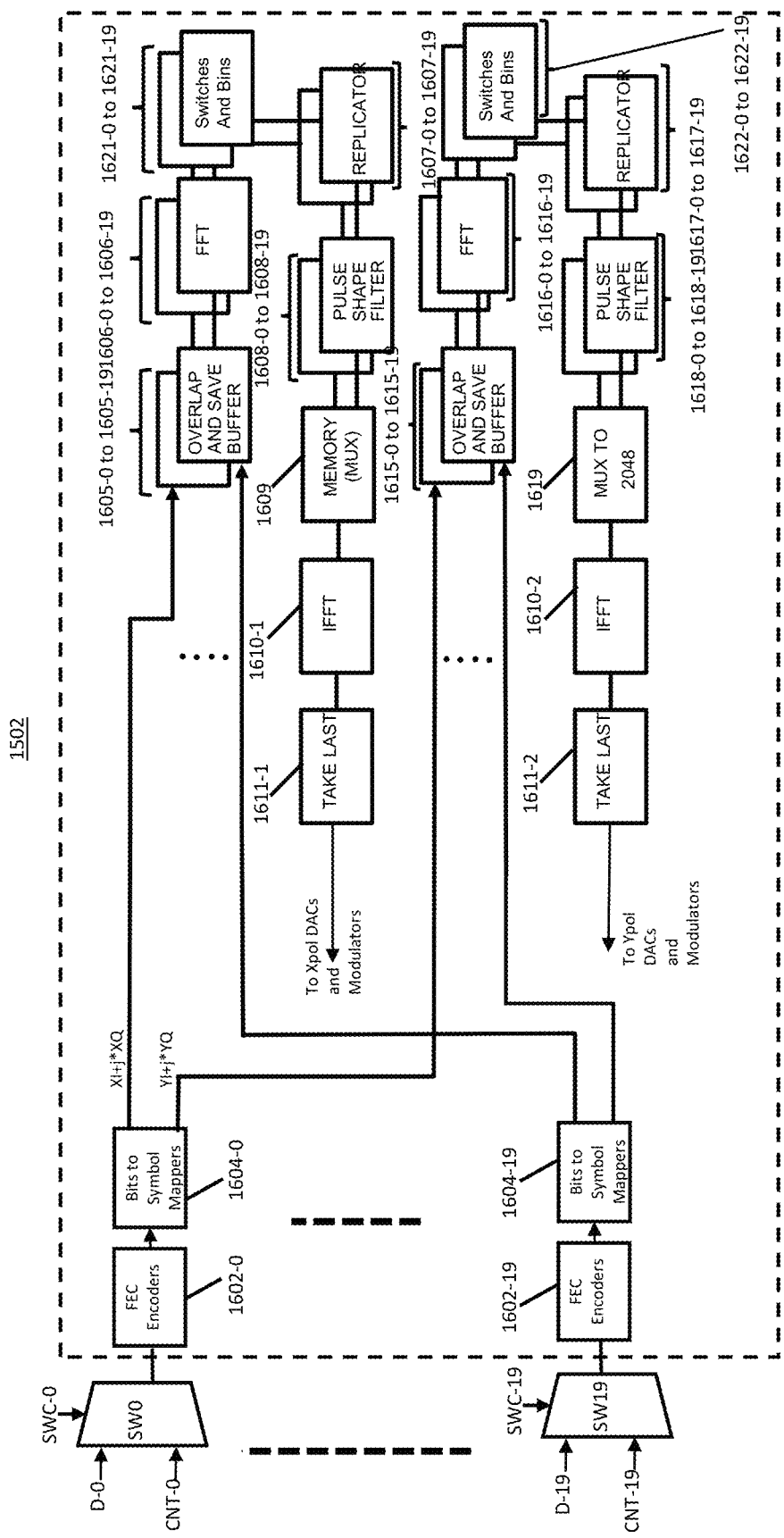
FIG. 16A is a block diagram showing an example of a transmitter digital signal processor (DSP).

FIG. 16A shows an example of the TX DSP 1502 in greater detail. The TX DSP 1502 can include FEC encoders 1602-0 to 1602-19, each of which can receive a respective one of a plurality of the outputs from the switches SW0 to SW19. The FEC encoders 1602-0 to 1602-19 carry out forward error correction coding on a corresponding one of the switch outputs, such as, by adding parity bits to the received data. The FEC encoders 1602-0 to 1602-19 can also provide timing skew between the subcarriers to correct for skew induced by link between the transceivers or transmission modules described above. In addition, the FEC encoders 1602-0 to 1602-19 can interleave the received data.

Each of the FEC encoders 1602-0 to 1602-19 provides an output to a corresponding one of a plurality of bits-to-symbol circuits, 1604-0 to 1604-19 (collectively referred to herein as "1104"). Each of the bits-to-symbol circuits 1604 can map the encoded bits to symbols on a complex plane. For example, the bits-to-symbol circuits 1604 can map four bits to a symbol in a dual-polarization QPSK constellation. Each of the bits-to-symbol circuits 1604 provides first symbols, having the complex representation XI+j*XQ, associated with a respective one of the switch outputs, such as D-0, to a DSP portion 1603. Data indicative of such first symbols is carried by the X polarization component of each subcarrier SC0-SC19.

Each of the bits-to-symbol circuits 1604 can also provide second symbols having the complex representation YI+j*YQ, also associated with a corresponding output of the switches SW0-SW19. Data indicative of such second symbols, however, is carried by the Y polarization component of each of subcarriers SC-0 to SC-19.

In some implementations, such mapping, as carried by the circuit 1604-0 to 1604-19, can define a particular modulation format for each subcarrier. That is, such circuit can define a mapping for all the optical subcarrier that is indicative of a binary phase shift keying (BPSK) modulation format, a quadrature phase shift keying (QPSK) modulation format, or an m-quadrature amplitude modulation (QAM, where m is a positive integer, e.g., 4, 8, 16, or 64) format. In another example, one or more of the optical subcarriers can have a modulation format that is different from the modulation format of other optical subcarriers. That is, one of the optical subcarriers can have a QPSK modulation format and another optical subcarrier can have a different modulation format, such as 8-QAM or 16-QAM. In another example, one of the optical subcarriers can have an 8-QAM modulation format and another optical subcarrier can have a 16 QAM modulation format. Accordingly, although all the optical subcarriers can carry data at the same data and or baud rate, one or more of the optical subcarriers can carry data at a different data or baud rate than one or more of the other optical subcarriers. Moreover, modulation formats, baud rates and data rates can be changed over time depending on capacity requirements. Adjusting such parameters can be achieved, for example, by applying appropriate signals to mappers 1604 based on control information or data.

As further shown in FIG. 16A, each of the first symbols output from each of the bits-to-symbol circuits 1604 is supplied to a respective one of the first overlap and save buffers 1605-0 to 1605-19 (collectively referred to herein as the overlap and save buffers 1605). Each the overlap and save buffers 1605 can buffer a particular number of symbols (e.g., 256 symbols). In some implementations, each of the overlap and save buffers 1605 can receive 128 of the first symbols or another number of such symbols at a time from a corresponding one of the bits to symbol circuits 1604. Thus, the overlap and save buffers 1605 can combine 128 new symbols from the bits to symbol circuits 1605, with the previous 128 symbols received from the bits to symbol circuits 1605.

Each of the overlap and save buffers 1605 supplies an output (e.g., in the time domain) to a corresponding one of the fast Fourier transform (FFT) circuits 1606-0 to 1606-19 (collectively referred to as the "FFTs 1606"). In some implementations, the output can include 256 symbols or another number of symbols. Each of the FFTs 1606 converts the received symbols to the frequency domain using or based on a fast Fourier transform. Each of the FFTs 1606 can provide the frequency domain data to the bins and switches blocks 1621-0 to 1621-19. As discussed in greater detail below, the bins and switches blocks 1621 include, can include memories or registers, also referred to as frequency bins (FB) or points, that store frequency components associated with each optical subcarrier.

Figure 16B:
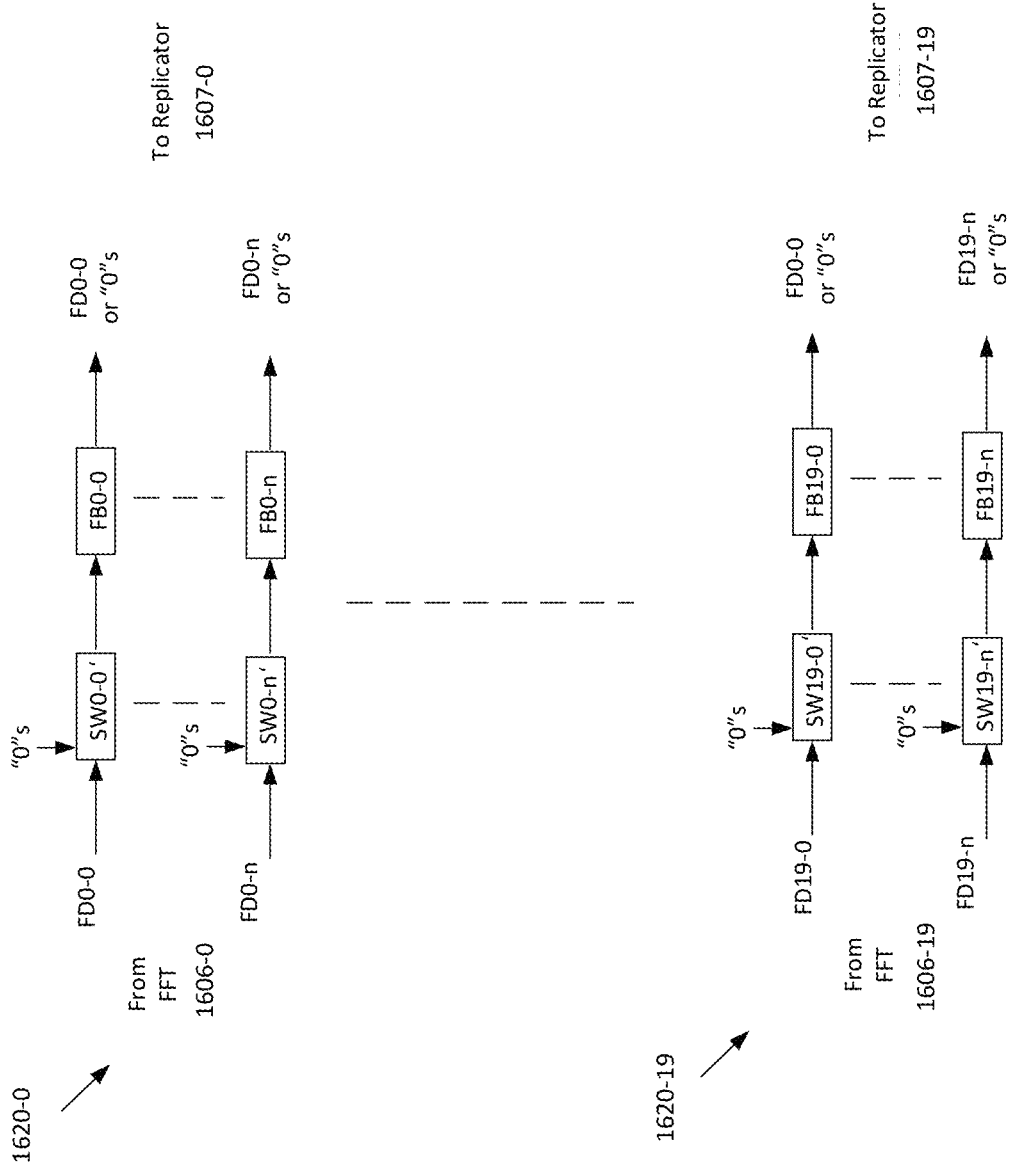
FIG. 16B illustrates a portion of a transmitter DSP in greater detail.

Selected frequency bins FB are shown in FIG. 16B. Groups of such frequency bins FB are associated with give subcarriers. Accordingly, for example, a first group of frequency bins, FB0-0 to FB0-*n*, is associated with SC0 and a second group of frequency bins FB19-0 to FB19-*n* with SC19 (where n is a positive integer). As further shown in FIG. 16B, each of the frequency bins FB is further coupled to a respective one of switches SW. For example, each of frequency bins FB0-0 to FB0-*n* is coupled to a respective one of switches SW0-0 to SW0-*n*, and each of FB19-0 to FB19-*n* is coupled to a respective one of switches or switch circuits SW19-0 to SW19-*n*.

Each of the switches SW selectively supplies either frequency domain data output from one of the FFT circuits 1606-0 to 1606-19 or a predetermined value, such as 0. In order to block or eliminate transmission of a particular subcarrier, the switches SW associated with the group of frequency bins FB associated with that optical subcarrier are configured to supply the zero value to corresponding frequency bins. Accordingly, in order to block the optical subcarrier SC0, the switches SW0-0' to SW0-*n*' supply zero (0) values to a respective one of the frequency bins FB0-0 to FB0-*n*. Further processing of the zero (0) values by replicator components 1007, as well as other components and circuits in the DSP 1502, result in drive signals supplied to the modulators 1510, such that the optical subcarrier SC0 is omitted from the optical output from the modulators.

In contrast, the switches SW' can be configured to supply the outputs of the FFTs 1606 (e.g., frequency domain data FD) to corresponding frequency bins FB. Further processing of the contents of the frequency bins FB by replicator components 1607 and other circuits in DSP 1502 result in drive signals supplied to modulators 1510, whereby, based on such drive signals, optical subcarriers are generated that correspond to the frequency bin groupings associated with that subcarrier.

In the example discussed above, the switches SW0-0' to SW0-*n*' supply frequency domain data FD0-0 to FD-n from the FFT 1606-0 to a respective one of switches SW0-0 to SW0-*n*. These switches, in turn, supply the frequency domain data to a respective one of the frequency bins FB0-0 to FB0-*n* for further processing, as described in greater detail below.

Each of replicator components or circuits 1607-0 to 1607-19 can replicate the contents of the frequency bins FB and store such contents (e.g., for T/2 based filtering of the subcarrier) in a respective one of the plurality of replicator components. Such replication may increase the sample rate. In addition, the replicator components or circuits 1607-0 to 1607-19 can arrange or align the contents of the frequency bins to fall within the bandwidths associated with the pulse shaped filter circuits 1608-0 to 1608-19 described below.

Each of the pulse shape filter circuits 1608-0 to 1608-19 can apply a pulse shaping filter to the data stored in the 512 frequency bins of a respective one of the plurality of replicator components or circuits 1607-0 to 1607-19 to thereby provide a respective one of a plurality of filtered outputs, which are multiplexed and subject to an inverse FFT, as described below. The pulse shape filter circuits 1608-1 to 1608-19 calculate the transitions between the symbols and the desired subcarrier spectrum so that the subcarriers can be packed together spectrally for transmission (e.g., with a close frequency separation). The pulse shape filter circuits 1608-0 to 1608-19 also can be used to introduce timing skew between the subcarriers to correct for timing skew induced by links between transceivers or transmission modules. The multiplexer component 1609, which can include a multiplexer circuit or memory, can receive the filtered outputs from the pulse shape filter circuits 1608-0 to 1608-19, and multiplex or combine such outputs together to form an element vector.

Next, the IFFT circuit or component 1610-1 can receive the element vector and provide a corresponding time domain signal or data based on an inverse fast Fourier transform (IFFT). In some implementations, the time domain signal can have a rate of 64 GSample/s. The take last buffer or memory circuit 1611-1, for example, can select the last 1024 samples, or another number of samples, from an output of the IFFT component or circuit 1610-1 and supply the samples to the DACs 1504-1 and 1504-2 (see FIG. 15) at 64 GSample/s, for example. As noted above, the DAC 1504-1 is associated with the in-phase (I) component of the X pol signal, and the DAC 1504-2 is associated with the quadrature (Q) component of the Y pol signal. Accordingly, consistent with the complex representation XI+jXQ, the DAC 1504-1 receives values associated with XI and the DAC 1504-2 receives values associated with jXQ. As indicated by FIG. 15, based on these inputs, the DACs 1504-1 and 504-2 provide analog outputs to the MZMD 1506-1 and the MZMD 1506-2, respectively.

As further shown in FIG. 16A, each of the bits-to-symbol circuits 1604-0 to 1604-19 outputs a corresponding one of symbols indicative of data carried by the Y polarization component of the polarization multiplexed modulated optical signal output in free space. As further noted above, these symbols can have the complex representation YI+j*YQ. Each such symbol can be processed by a respective one of the overlap and save buffers 1615-0 to 1615-19, a respective one of the FFT circuits 1616-0 to 1616-19, a respective one of the replicator components or circuits 1617-0 to 1617-19, the pulse shape filter circuits 1618-0 to 1618-19, the multiplexer or memory 1619, the IFFT 1610-2, and the take last buffer or memory circuit 1611-2, to provide processed symbols having the representation YI+j*YQ in a manner similar to or the same as that discussed above in generating processed symbols XI+j*XQ output from the take last circuit 1611-1. In addition, symbol components YI and YQ are provided to the DACs 1504-3 and 1504-4 (FIG. 15), respectively. Based on these inputs, the DACs 1504-3 and 1504-4 provide analog outputs to the MZMD 1506-3 and the MZMD 1506-4, respectively, as discussed above.

While FIG. 16A shows the DSP 1502 as including a particular number and arrangement of functional components, in some implementations, the DSP 1502 can include additional functional components, fewer functional components, different functional components, or differently arranged functional components. In addition, typically the number of overlap and save buffers, FFTs, replicator circuits, and pulse shape filters associated with the X component can be equal to the number of switch outputs, and the number of such circuits associated with the Y component also can be equal to the number of switch outputs. However, in other examples, the number of switch outputs can be different from the number of these circuits.

As noted above, based on the outputs of the MZMDs 1506-1 to 1506-4, a plurality of the optical subcarriers SC0 to SC19 can be output into free space (FIG. 15), for example, in the direction of another satellite.

In some implementations, the number of optical subcarriers transmitted from one transceiver or transmission module to another transceiver or transmission module can vary over time based, for example, on capacity requirements at the transceivers or transmission modules. For instance, if less downstream capacity is required initially at one or more of the transceivers or transmission modules, the transmitter of a source transceiver or transmission modules can be configured to output fewer optical subcarriers. In contrast, if further capacity is required later, the transmitter of a source transceiver or transmission module can provide more optical subcarriers.

In addition, if based on changing capacity requirements, a particular transceiver or transmission module needs to be adjusted, the output capacity of that transceiver or transmission module can be increased or decreased by increasing or decreasing the number of optical subcarriers output from that transceiver or transmission module.

As noted above, by storing and subsequently processing zeros (0s) or other predetermined values in the frequency bin FB groupings associated with a given optical subcarrier, that optical subcarrier can be removed or eliminated. To add or reinstate such an optical subcarrier, frequency domain data output from the FFTs 1606 can be stored in the frequency bins FB and subsequently processed to provide the corresponding optical subcarrier. Thus, optical subcarriers can be selectively added or removed from the optical outputs of each transmitter, such that the number of subcarriers output from such transmitters can be varied, as desired.

In the above example, zeros (0s) or other predetermined values are stored in selected frequency bins FBs to prevent transmission of a particular optical subcarrier. In some implementations, such zeroes or values can instead be provided in a manner similar to that described above, at the outputs of corresponding replicator components 1607 or stored in corresponding locations in the memory or multiplexer 1609. Alternatively, the zeroes or values noted above can be provided in a manner similar to that described above, at corresponding outputs of the pulse shape filters 1608.

Figure 16C:
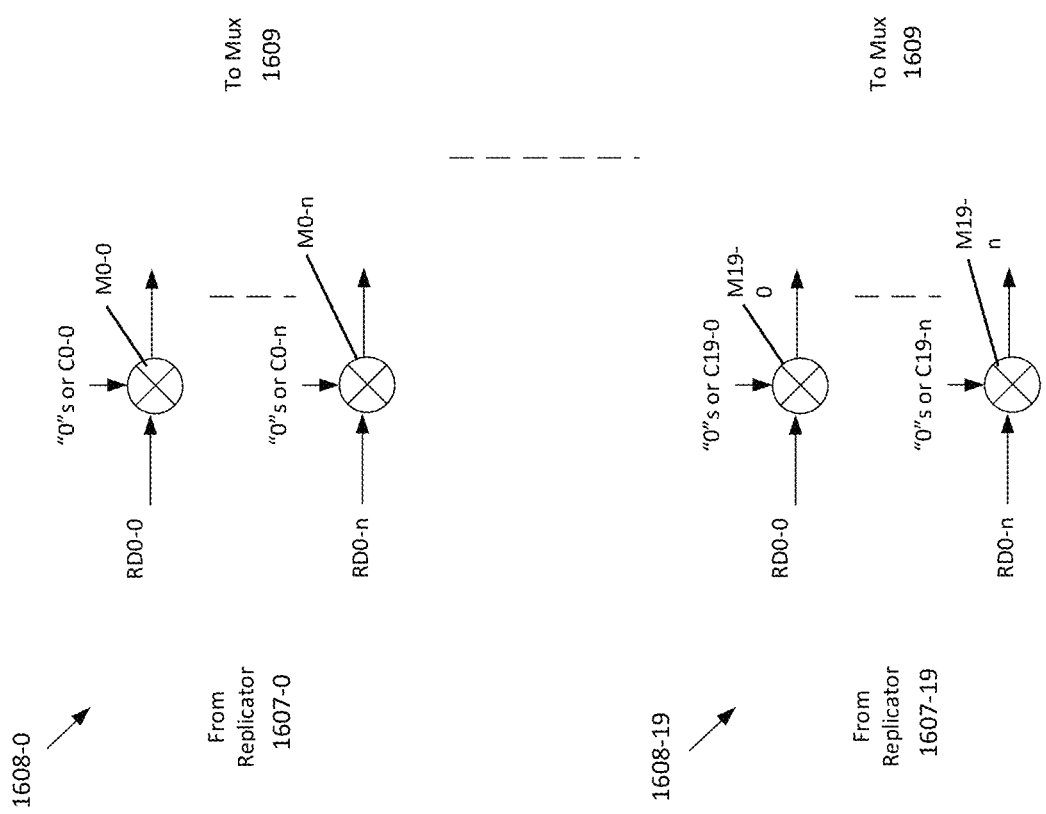
FIG. 16C illustrates a portion of a transmitter DSP in greater detail.

In a further example, a corresponding one of the pulse shape filters 1608-1 to 1608-19 can selectively generate zeroes or predetermined values that, when further processed, also cause one or more of the optical subcarriers to be omitted from the output of a transmitter. In particular, as shown in FIG. 16C, the pulse shape filters 1608-0 to 1608-19 are shown as including groups of multiplier circuits M0-0 to M0-$n$ . . . M19-0 to M19-$n$ (also individually or collectively referred to as M). Each multiplier circuit M constitutes part of a corresponding butterfly filter. In addition, each multiplier circuit grouping is associated with a corresponding one of the optical subcarriers.

Each multiplier circuit M receives a corresponding one of output groupings RD0-0 to RD0-$n$ . . . RD19-0 to RD19-$n$ from the replicator components 1607. In order to remove or eliminate one of optical subcarriers, the multiplier circuits M receiving the outputs within a particular grouping associated with that optical subcarrier multiply such outputs by zero (0), such that each multiplier M within that group generates a product equal to zero (0). The zero products then are subject to further processing similar to that described above to provide drive signals to modulators 1510 that result in a corresponding optical subcarrier being omitted from the output of the transmitter.

In contrast, in order to provide an optical subcarrier, each of the multiplier circuits M within a particular groping can multiply a corresponding one of the replicator outputs RD by a respective one of coefficients C0-0 to C0-$n$ . . . C19-0 to C19-$n$, which results in at least some non-zero products being output. Based on the products output from the corresponding multiplier grouping, drive signals are provided to the modulators 1510 to output the desired optical subcarrier from the transmitter.

Accordingly, in order to block or eliminate the optical subcarrier SC0, each of the multiplier circuits M0-0 to M0-$n$ (associated with the optical subcarrier SC0) can multiply a respective one of the replicator outputs RD0-0 to RD0-$n$ by zero (0). Each such multiplier circuit, therefore, provides a product equal to zero, which is further processed such that resulting drive signals cause the modulators 1510 to provide an optical output without the optical subcarrier SC0. In order to reinstate the optical subcarrier SC0, the multiplier circuits M0-0 to M0-$n$ multiply a corresponding one of the appropriate coefficients C0-0 to C0-$n$ by a respective one of the replicator outputs RD0-0 to RD0-$n$ to provide products, at least some of which are non-zero. Based on these products, the modulator drive signals are generated that result in the optical subcarrier SC0 being output.

The above examples are described in connection with generating or removing the X component of an optical subcarrier. The processes and circuitry described above is employed or included in the DSP 1502 and optical circuitry used to generate the Y component of the subcarrier to be blocked. For example, the switches and bins circuit blocks 1622-0 to 1622-19, can have a similar structure and operate in a similar manner as the switches and bins circuit blocks 1621 described above to provide zeroes or frequency domain data, as the case may be, to selectively block the Y component of one or more the optical subcarriers. Alternatively, multiplier circuits, like those described above in connection with FIG. 16C, can be provided to supply zero products output from the selected pulse shape filters 1618 in order to block the Y component of a particular subcarrier or, if non-zero coefficients are provided to the multiplier circuits instead, generate the optical subcarrier.

Thus, the above examples illustrate mechanisms by which the optical subcarriers can be selectively blocked from or added to the output of a transmitter. In some implementations, the circuitry described above in connection with FIGS. 16B and/or 16C can be configured such that a first number of optical subcarriers are output from a transmitter during a first period of time based on initial capacity requirements. Later, during a second period of time, a second number of optical subcarriers can be output from the transmitter based on capacity requirements different from the first capacity requirements.

Figures 17A, 17B:
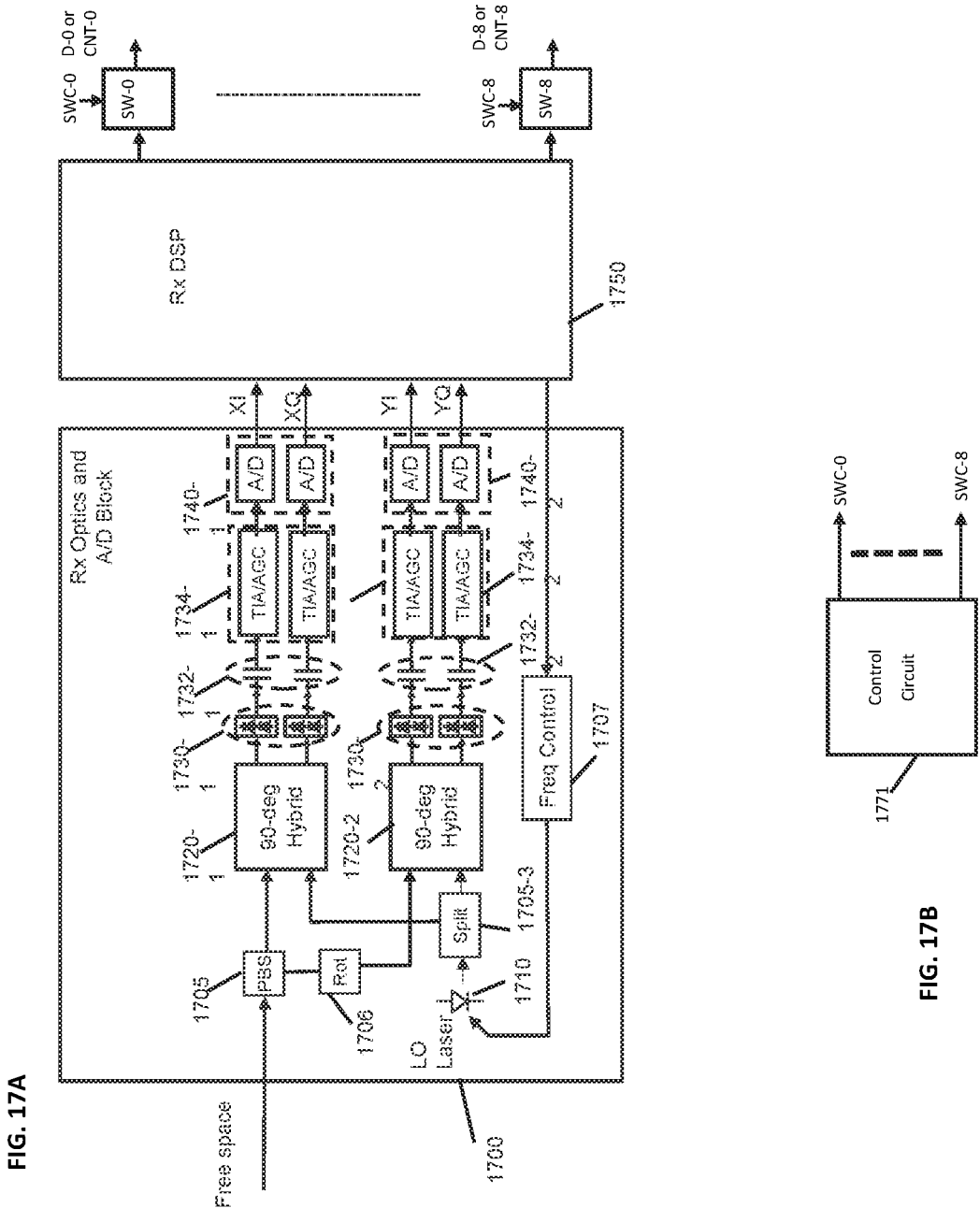
FIGS. 17A and 17B shows an example components of a transceiver used to receive data.

The optical subcarriers SC0 to SC19 can be provided to another transceiver or transmission module via free space optical communication. FIG. 17A illustrates components of an optical transceiver for receiving data (e.g., a receiver or receiver module) in greater detail.

As shown in FIG. 17A, a receiver can include an Rx optics and A/D block 1700, which, in conjunction with the DSP 1750, can carry out coherent detection. The block 1700 can include a polarization splitter (PBS) 1705 with a first output 1705-1 and a second output 1705-2, a local oscillator (LO) laser 1710, 90 degree optical hybrids or mixers 1720-1 and 1720-2 (referred to generally as hybrid mixers 720 and individually as a hybrid mixer 1720), detectors 1730-1 and 1730-2 (referred to generally as detectors 1730 and individually as a detector 1730, each including either a single photodiode or balanced photodiode), AC coupling capacitors 1732-1 and 1732-2, transimpedance amplifiers/automatic gain control circuits TIA/AGC 1734-1 and 1734-2, ADCs 1740-1 and 1740-2 (referred to generally as ADCs 1740 and individually as an ADC 1740).

The polarization beam splitter (PBS) 1705 cam include a polarization splitter that receives an input polarization multiplexed optical signal including the optical sub carriers SC0 to SC19 received via free space optical communication (e.g., from another satellite). The PBS 1705 can split the incoming optical signal into the two X and Y orthogonal polarization components. The Y component can be supplied to a polarization rotator 1706 that rotates the polarization of the Y component to have the X polarization. The hybrid mixers 1720 can combine the X and rotated Y polarization components with light from the local oscillator laser 1710 (e.g., a tunable laser). For example, the hybrid mixer 1720-1 can combine a first polarization signal (e.g., the component of the incoming optical signal having a first or X (TE) polarization output from a first PBS port) with light from the local oscillator 1710, and the hybrid mixer 1720-2 can combine the rotated polarization signal (e.g., the component of the incoming optical signal having a second or Y (TM) polarization output from a second PBS port) with the light from the local oscillator 710. In some implementations, the polarization rotator 1790 can be provided at the PBS output to rotate Y component polarization to have the X polarization.

The detectors 1730 can detect mixing products output from the optical hybrids to form corresponding voltage signals, which are subject to AC coupling by the capacitors 1732-1 and 1732-1, as well as amplification and gain control by the TIA/AGCs 1734-1 and 1734-2. The outputs of the TIA/AGCs 1734-1 and 1734-2 and the ADCs 1740 can convert the voltage signals to digital samples. For example, two detectors (e.g., photodiodes) 1730-1 can detect the X polarization signals to form the corresponding voltage signals, and a corresponding two ADCs 1740-1 can convert the voltage signals to digital samples for the first polarization signals after amplification, gain control and AC coupling. Similarly, two detectors 1730-2 can detect the rotated Y polarization signals to form the corresponding voltage signals, and a corresponding two ADCs 1740-2 can convert the voltage signals to digital samples for the second polarization signals after amplification, gain control and AC coupling. The RX DSP 1750 can process the digital samples associated with the X and Y polarization components to output data associated with one or more optical subcarriers within a group of optical subcarriers SC0 to SC19 encompassed by the bandwidth (e.g., one of the bandwidths BWj, BWk, BWl, and BWm) associated with the transceiver or communications module housing the particular DSP 1750. For example, as shown in FIG. 14, the optical subcarriers SC0 to SC8 are within a bandwidth BSj, and such optical subcarriers can be processed by the receiver in the first transceiver or communications module. However, the optical subcarriers SC5 to SC13 within a bandwidth BWk can be processed by the receiver in the second transceiver or communications module. That is, the bandwidths BWj and BWk overlap, such that the optical subcarriers within the overlapped portions of these bandwidths, namely, the optical subcarriers SC5 to SC8, will be processed by the receivers in both the first and the second transceivers or communications modules. If the data associated with these optical subcarriers is intended to be output from the second transceiver or communications module, switch circuits can be provided to selectively output such data at the second transceiver or communications module but not from the first transceiver or communications module.

While FIG. 17A shows a receiver as including a particular number and arrangement of components, in some implementations, a receiver can include additional components, fewer components, different components, or differently arranged components. The number of detectors 1730 and/or ADCs 1740 can be selected to implement a receiver that is capable of receiving a polarization multiplexed signal. In some instances, one of the components illustrated in FIG. 17A can carry out a function described herein as being carried out by another one of the components illustrated in FIG. 17A.

In order to select a particular optical subcarrier or group of optical subcarriers at a transceiver or communications module, the local oscillator 1710 can be tuned to output light having a wavelength or frequency relatively close to the selected optical subcarrier wavelength(s) to thereby cause a beating between the local oscillator light and the selected optical subcarrier(s). Such beating will either not occur or will be significantly attenuated for the other non-selected subcarriers so that data carried by the selected optical subcarrier(s) is detected and processed by the DSP 1650.

As noted above, each of the transceivers or communications modules can have a smaller bandwidth than the bandwidth associated with other transceivers or communications modules. The optical subcarriers encompassed by each of the transceivers or communications modules can be determined by the frequency of the local oscillator laser 1710 in the receiver. Tuning the local oscillator frequency, for example, by changing the temperature of the local oscillator laser 1710 can result in corresponding shifts in the bandwidth to encompass a different group of optical subcarriers than were detected prior to such bandwidth shift. The temperature of the local oscillator laser 1710 can be controlled with a thin film heater, for example, provided adjacent to the local oscillator laser or to portions of the local oscillator laser such as the mirror sections. Alternatively, the local oscillator laser can be frequency tuned by controlling the current supplied to the laser. The local oscillator laser 1710 can be a semiconductor laser, such as a distributed feedback laser or a distributed Bragg reflector laser.

In some implementations, the maximum bandwidth or number of optical subcarriers that can be received, detected, and processed by a transceiver or communications module, can be restricted based on hardware limitations of the various circuit components in its receiver, and, therefore may be fixed. For example, the bandwidth associated with each of a first, second, third, and fourth transceivers or communications modules can may be less than a associated with a fifth transceiver or communications module. Further, the number of transceivers or communications modules can be greater than the number of optical subcarriers output from the fifth transceiver or communications module. In addition, the number of upstream optical subcarriers received by the fifth transceiver or communications module can be equal to the number of optical subcarriers transmitted by the fifth transceiver or communications module in the upstream direction. Alternatively, the number of optical subcarriers transmitted in the upstream direction collectively by the first, second, third, and fourth transceivers or communications modules can less than or greater than the number of downstream optical subcarriers output from the fifth transceiver or communications module. Further, in some implementations, one or more of the transceivers or communications modules can output a single optical subcarrier.

In some implementations, the bandwidths associated with the transceiver or communications module can overlap, such that certain optical subcarriers can be detected by multiple transceivers or communications modules. If the data associated with such optical subcarriers is intended for one of those transceivers or communications modules, but not the others, switch circuitry can be provided in the transceiver or communications module to output the data selectively at the intended transceiver or communications module but not the others.

For example, as further shown in FIG. 17A, the switches or circuits SW-0 to SW-8 can be provided at the output of the DSP 1750 to selectively output the data detected from the received optical subcarriers based on a respective one of control signals CNT-0 to CNT-8 output from the control circuit 1771 (see FIG. 17B), which, like the control circuit 1571, can include a microprocessor, FPGA, or other processor circuit. Control signals can designate the output of each respective switch. Accordingly, if data carried by predetermined subcarriers is intended to be output at a particular transceiver or communications module, the switches SW at that secondary node can be configured, based on the received control signals CNT, to supply the desired data, but block data not intended for that transceiver or communications module. In some implementations, at least some of the switches (e.g., SW-0 to SW-8, as shown in FIG. 17A) can be omitted, such that data stream are output directly from the Rx DSP 1750.

Figure 18:
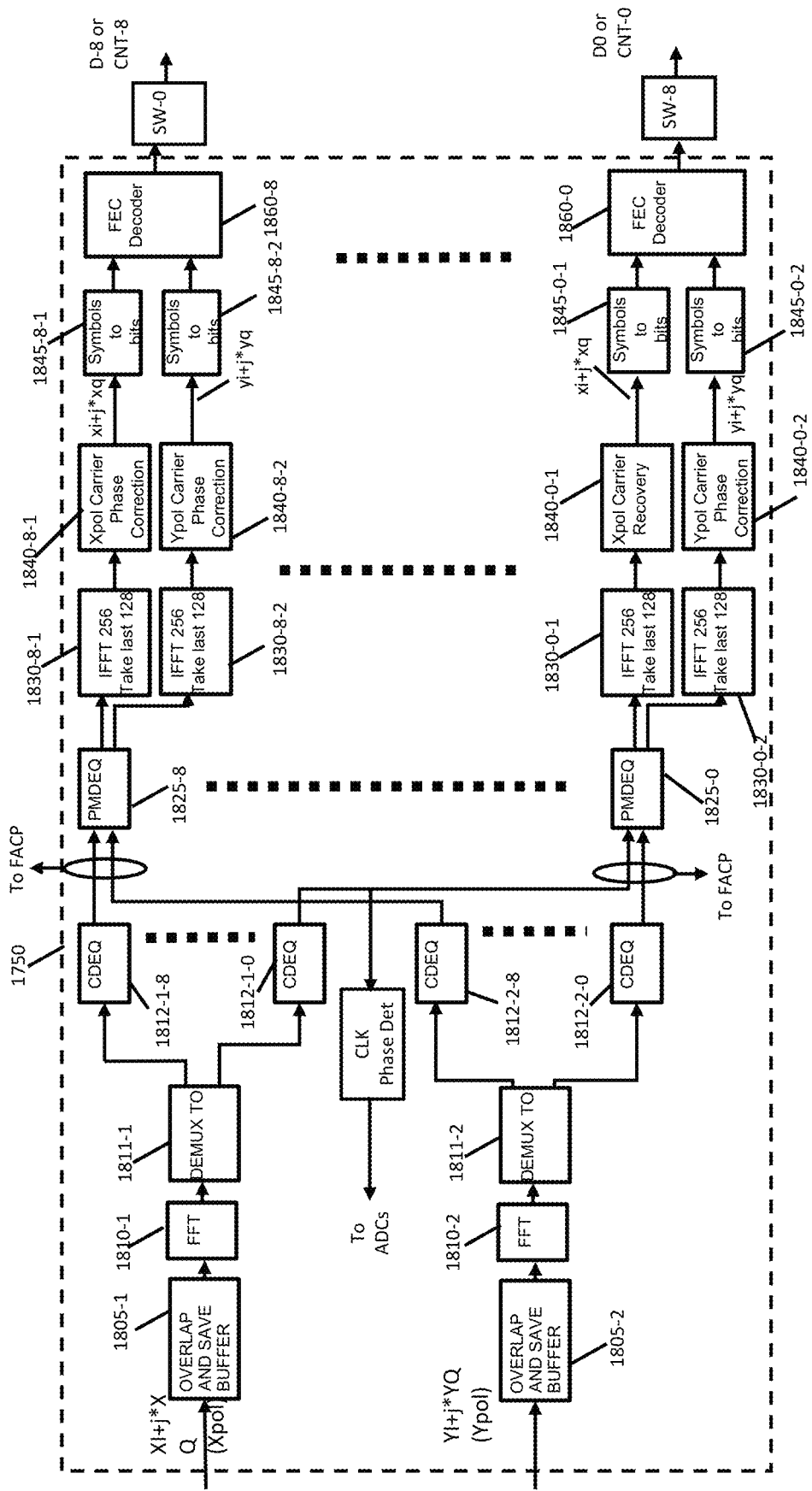
FIG. 18 shows an example of a receiver DSP.

FIG. 18 illustrates exemplary components of the receiver digital signal processor (DSP) 1750. As noted above, the analog-to-digital (A/D) circuits 1740-1 and 1740-2 (FIG. 17A) output digital samples corresponding to the analog inputs supplied thereto. In some implementations, the samples may be supplied by each A/D circuit at a rate of 64 GSamples/s. The digital samples correspond to symbols carried by the X polarization of the optical subcarriers and may be represented by the complex number XI+jXQ. The digital samples may be provided to the overlap and save buffer 1805-1, as shown in FIG. 18. The FFT component or circuit 1810-1 can receive the 2048 vector elements, for example, from the overlap and save buffer 1805-1 and convert the vector elements to the frequency domain using, for example, a fast Fourier transform (FFT). The FFT component 1810-1 can convert the 2048 vector elements to 2048 frequency components, each of which can be stored in a register or "bin" or other memory, as a result of carrying out the FFT.

The frequency components then can be demultiplexed by the demultiplexer 811-1, and groups of such components can be supplied to a respective one of the chromatic dispersion equalizer circuits CDEQ 1812-1-0 to 1812-1-8, each of which may include a finite impulse response (FIR) filter that corrects, offsets or reduces the effects of, or errors associated with, chromatic dispersion of the transmitted optical subcarriers. Each of the CDEQ circuits 1812-1-0 to 1812-1-8 supplies an output to a corresponding polarization mode dispersion (PMD) equalizer circuit 1825-0 to 1825-8 (which individually or collectively may be referred to as PMB equalizer circuits 1825).

Digital samples output from the A/D circuits 1840-2 associated with Y polarization components of optical subcarrier SC1 can be processed in a similar manner to that of digital samples output from the A/D circuits 1840-1 and associated with the X polarization component of each optical subcarrier. In particular, the overlap and save buffer 1805-2, the FFT 1810-2, the demultiplexer 1811-2, and the CDEQ circuits 1812-2-0 to 1812-2-8 can have a similar structure and operate in a similar fashion as the buffer 1805-1, the FFT 1810-1, the demultiplexer 1811-1, and the CDEQ circuits 1812-1-0 to 1812-1-8, respectively. For example, each of the CDEQ circuits 1812-2-0 to 1812-8 can include an FIR filter that corrects, offsets, or reduces the effects of, or errors associated with, chromatic dispersion of the transmitted optical subcarriers. In addition, each of the CDEQ circuits 1812-2-0 to 1812-2-8 provide an output to a corresponding one of the PMDEQ 1825-0 to 1825-8.

As further shown in FIG. 18, the output of one of the CDEQ circuits, such as the CDEQ 1812-1-0 can be supplied to a clock phase detector circuit 1813 to determine a clock phase or clock timing associated with the received subcarriers. Such phase or timing information or data can be supplied to the ADCs 1740-1 and 1740-2 to adjust or control the timing of the digital samples output from the ADCs 1740-1 and 1740-2.

Each of the PMDEQ circuits 1825 can include another FIR filter that corrects, offsets or reduces the effects of, or errors associated with, PMD of the transmitted optical subcarriers. Each of the PMDEQ circuits 1825 can supply a first output to a respective one of the IFFT components or circuits 1830-0-1 to 1830-8-1 and a second output to a respective one of the IFFT components or circuits 1830-0-2 to 1830-8-2, each of which can convert a 256-element vector, in this example, back to the time domain as 256 samples in accordance with, for example, an inverse fast Fourier transform (IFFT).

Time domain signals or data output from the IFFT 1830-0-1 to 1830-8-1 are supplied to a corresponding one of the Xpol carrier phase correction circuits 1840-1-1 to 1840-8-1, which can apply carrier recovery techniques to compensate for the X polarization transmitter (e.g., the laser 1508) and the receiver (e.g., the local oscillator laser 1710) linewidths. In some implementations, each carrier phase correction circuit 1840-1 to 1840-8-1 can compensate or correct for frequency and/or phase differences between the X polarization of the transmit signal and the X polarization of light from the local oscillator 1700 based on an output of the Xpol carrier recovery circuit 1840-0-1, which performs carrier recovery in connection with one of the optical subcarriers based on the outputs of the IFFT 1830-01. After such X polarization carrier phase correction, the data associated with the X polarization component may be represented as symbols having the complex representation xi+j*xq in a constellation, such as a QPSK constellation or a constellation associated with another modulation formation, such as an m-quadrature amplitude modulation (QAM), m being an integer. In some implementations, the taps of the FIR filter included in one or more of the PMDEQ circuits 1825 can be updated based on the output of at least one of the carrier phase correction circuits 1840-0-1 to 1840-8-01.

In a similar manner, time domain signals or data output from the IFFT 1830-0-2 to 1830-8-2 are supplied to a corresponding one of the Ypol carrier phase correction circuits 1840-0-2 to 1840-8-2, which may compensate or correct for the Y polarization transmitter (e.g., the laser 1508) and the receiver (e.g., the local oscillator laser 1710) linewidths. In some implementations, each carrier phase correction circuit 1840-0-2 to 1840-8-2 also can correct or compensate for frequency and/or phase differences between the Y polarization of the transmit signal and the Y polarization of light from the local oscillator 1710. After such Y polarization carrier phase correction, the data associated with the Y polarization component can be represented as symbols having the complex representation yi+j*yq in a constellation, such as a QPSK constellation or a constellation associated with another modulation formation, such as an m-quadrature amplitude modulation (QAM), m being an integer. In some implementations, the output of one of the circuits 1840-0-2 to 1840-8-2 can be used to update the taps of the FIR filter included in one or more of the PMDEQ circuits 1825 instead of, or in addition to, the output of at least one of the carrier recovery circuits 1840-0-1 to 1840-8-1.

As further shown in FIG. 18, the output of carrier recovery circuits (e.g., the carrier recovery circuit 1840-0-1) also can be supplied to the carrier phase correction circuits 1840-1-1 to 1840-8-1 and 1840-0-2 to 1840-8-2, whereby the phase correction circuits can determine or calculate a corrected carrier phase associated with each of the received optical subcarriers based on one of the recovered carriers, instead of providing multiple carrier recovery circuits, each of which is associated with a corresponding optical subcarrier. The equalizer, carrier recovery, and clock recovery can be further enhanced by utilizing the known (training) bits that may be included in control signals CNT, for example by providing an absolute phase reference between the transmitted and local oscillator lasers.

Each of the symbols-to-bits circuits or components 1845-0-1 to 1845-8-1 can receive the symbols output from a corresponding one of the circuits 1840-0-1 to 1840-8-1 and map the symbols back to bits. For example, each of the symbol-to-bits components 1845-0-1 to 1845-8-1 can map one X polarization symbol, in a QPSK or m-QAM constellation, to Z bits, where Z is an integer. For dual-polarization QPSK modulated subcarriers, Z is four. Bits output from each of the components 1845-0-1 to 1845-8-1 are provided to a corresponding one of the FEC decoder circuits 1860-0 to 1860-8.

Y polarization symbols are output form a respective one of the circuits 1840-0-2 to 1840-8-2, each of which has the complex representation yi+j*yq associated with data carried by the Y polarization component. Each Y polarization, like the X polarization symbols noted above, can be provided to a corresponding one of the bit-to-symbol circuits or components 1845-0-2 to 1845-8-2, each of which has a similar structure and operates in a similar manner as the symbols-to-bits components 1845-0-1 to 1845-8-1. Each of the circuits 1845-0-2 to 1845-8-2 can provide an output to a corresponding one of the FEC decoder circuits 1860-0 to 1860-8.

Each of the FEC decoder circuits 1860 can remove errors in the outputs of the symbol-to-bit circuits 1845 using, for example, forward error correction. Such error corrected bits, which can include user data for output from the transceivers or communications modules, can be supplied to a corresponding one of the switch circuits SW-0 to SW-8. As noted above, the switch circuits SW-0 to SW-8 in each transceiver or communications module can selectively supply or block data based on whether such data is intended to be output from the transceiver or communications module. In addition, if one of the received optical subcarriers' control information (CNT), such as information identifying the switches SW that output data and other switches SW that block data, the control information may be output from one of the switches and, based on such control information, the control circuit 1771 in the secondary nodes to generate the control signals CNT.

In some implementations, data can be blocked from output from the DSP 1750 without the use of the switches SW-0 to SW-8. As an example, zero (0) or other predetermined values can be stored in frequency bins associated with the blocked data, as well as the optical subcarrier corresponding to the blocked data. Further, as described above, processing of such zeroes or predetermined data by circuitry in the DSP 1750 will result in null or zero data outputs, for example, from a corresponding one of the FEC decoders 1860. The switch circuits provided at the outputs of the FFTs 1810-1 and 1810-2, like the switch circuits SW described above in FIG. 16B, can be provided to selectively insert zeroes or predetermined values for selectively blocking corresponding output data from the DSP 1750. Such switches also can be provided at the output of or within the demultiplexers 1811-1 and 1811-2 to selectively supply zero or predetermined values.

In another example, zeroes (0s) can be inserted in the chromatic dispersion equalizer (CDEQ) circuits 812 associated with both the X and Y polarization components of each optical subcarrier. In particular, multiplier circuits (provided in corresponding butterfly filter circuits), like multiplier circuits M described above, can selectively multiply the inputs to the CDEQ circuit 1812 by either zero or a desired coefficient. As discussed above in connection with FIG. 16C, multiplication by a zero generates a zero product. When such zero products are further processed by corresponding circuitry in the DSP 1750 (e.g., corresponding IFFTs 1830, carrier phase correction components 1840, symbol-to-bits components 1845, and FEC decoder), a corresponding output of the DSP 1750 will also be zero. Accordingly, data associated with an optical subcarrier received by a secondary node receiver 112, but not intended for output from that receiver, can be blocked.

However, if capacity requirements change and such previously blocked data is to be output from a given transceiver's or communications module's receiver DSP 1750, appropriate coefficients can be supplied to the multiplier circuits, such that at least some of the inputs thereto are not multiplied by zero. Upon further processing, as noted above, data associated with the inputs to the multiplier circuits and corresponding to a particular optical subcarrier is output from a transceiver's or communications module's receiver DSP 1750.

While FIG. 18 shows the DSP 1750 as including a particular number and arrangement of functional components, in some implementations, the DSP 1750 can include additional functional components, fewer functional components, different functional components, or differently arranged functional components.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, some or all of the components described herein can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not always be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

FIG. 19 shows an example computer system 1900. One or more of the systems described herein (e.g., the terrestrial control system 150, as shown in FIG. 1) can be implemented at least in part using one or more of the computer systems 1900. The computer system 1900 includes a processor 1910, a memory 1920, a storage device 1930 and an input/output device 1940. Each of the components 1910, 1920, 1930 and 1940 can be interconnected, for example, by a system bus 1950. The processor 1910 is capable of processing instructions for execution within the system 1900. In some implementations, the processor 1910 is a single-threaded processor, a multi-threaded processor, or another type of processor. The processor 1910 is capable of processing instructions stored in the memory 1920 or on the storage device 1930. The memory 1920 and the storage device 1930 can store information within the system 1900.

The input/output device 1940 provides input/output operations for the system 1900. In some implementations, the input/output device 1940 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. for communicating with a network 1970. In some implementations, the input/output device can include driver devices configured to receive input data and send output data to other input/output devices, e.g., keyboard, printer and display devices 1960. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations also can be combined in the same implementation. Conversely, various features that are described in the context of a single implementation also can be implemented in multiple embodiments separately or in any suitable sub-combination.

A number of implementations have been described. Nevertheless, it will be understood that various modifications may be made without departing from the spirit and scope of the invention. Accordingly, other implementations are within the scope of the claims.

What is claimed is:

1. An apparatus, comprising: an optical transmitter including: a laser, and a modulator, the laser being operable to supply an optical signal to the modulator, and the modulator being operable to supply a modulated optical signal including a plurality of optical subcarriers based on the optical signal supplied by the laser and a plurality of drive signals; an optical splitter having an input and a plurality of outputs, the input of the optical splitter being optically coupled to the transmitter, such that each of the plurality of outputs of the optical splitter is operable to supply the plurality of optical subcarriers; a plurality of lenses, each of the plurality of lenses being optically coupled to a respective one of the plurality of outputs of the optical splitter, each of the plurality of lenses being operable to receive a corresponding copy of the plurality of optical subcarriers; and a plurality of mirrors, each of the plurality of mirrors being optically coupled to a corresponding one of the plurality of lenses, such that each of the plurality of mirrors is operable to direct a respective copy of the plurality of subcarriers for transmission through free space.

2. The apparatus in accordance with claim 1, wherein each of the plurality of optical subcarriers is a Nyquist subcarrier.

3. The apparatus in accordance with claim 1, further including a plurality of driver circuits operable to supply the plurality of drive signals.

4. The apparatus in accordance with claim 3, further including digital-to-analog conversion circuitry operable to provide an analog signal to the driver circuits based on digital signals.

5. The apparatus in accordance with claim 4, further including a digital signal processor operable to provide the digital signals to the digital-to-analog conversion circuitry, wherein the digital signal processor is operable to provide the digital signals based on data provided to the digital signal processor.

6. The apparatus in accordance with claim 1, wherein the plurality of optical subcarriers is a first plurality of optical subcarriers, the apparatus further including an optical receiver operable to receive a second plurality of optical subcarriers.

7. An apparatus, comprising: an optical transmitter including: a laser, and a modulator, the laser being operable to supply an optical signal to the modulator, and the modulator being operable to supply a modulated optical signal including a plurality of optical subcarriers based on the optical signal supplied by the laser and a plurality of drive signals; an optical splitter operable to receive the plurality of optical subcarriers and supply the plurality of optical subcarriers from an output of the optical splitter; a lens operable to receive the plurality of optical subcarriers from the output of the splitter; a plurality of steering mechanisms, whereby one of the plurality of steering mechanisms is operable to direct, through free-space, the plurality of optical subcarriers provided from the lens to one of a plurality transceivers, said one of the plurality of transceivers including a receiver that is operable to receive the plurality of optical subcarriers.

8. The apparatus in accordance with claim 7, wherein each of the first plurality of optical subcarriers is a Nyquist subcarrier.

9. The apparatus in accordance with claim 8, wherein each of the second plurality of optical subcarriers is a Nyquist subcarrier.

\* \* \* \* \*